US006892122B2

(12) United States Patent
Miyata et al.

(10) Patent No.: US 6,892,122 B2
(45) Date of Patent: May 10, 2005

(54) APPARATUS AND METHOD FOR CONTROLLING ACTIVATION OF VEHICLE OCCUPANT PROTECTING DEVICE

(75) Inventors: Yujiro Miyata, Toyota (JP); Tomoki Nagao, Nagoya (JP); Katsuji Imai, Nagoya (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 133 days.

(21) Appl. No.: 10/380,287

(22) PCT Filed: Sep. 26, 2001

(86) PCT No.: PCT/IB01/01753

§ 371 (c)(1), (2), (4) Date: Mar. 12, 2003

(87) PCT Pub. No.: WO02/28688

PCT Pub. Date: Apr. 11, 2002

(65) Prior Publication Data

US 2004/0011580 A1 Jan. 22, 2004

(30) Foreign Application Priority Data

Oct. 2, 2000 (JP) ....................................... 2000-302645

(51) Int. Cl.[7] ................................................ B60R 21/32

(52) U.S. Cl. ...................... 701/45; 280/728.3; 280/735; 180/274

(58) Field of Search ............................ 701/45, 36, 124, 701/47; 280/728.3, 730.2, 734, 735, 729, 743.2, 806, 807; 180/274, 65.2, 65.6, 268, 801.1, 232, 282; 342/72; 340/436, 903, 435

(56) References Cited

U.S. PATENT DOCUMENTS 4,958,851 A * 9/1990 Behr et al. .................. 280/735
5,916,289 A * 6/1999 Fayyad et al. ................ 701/45
5,967,548 A 10/1999 Kozyreff ..................... 280/735
6,036,225 A * 3/2000 Foo et al. ................... 280/735
6,081,044 A * 6/2000 Anthofer et al. ........... 307/10.1
6,086,092 A * 7/2000 Hill ........................... 280/729
6,104,973 A * 8/2000 Sugiyama et al. ............ 701/46
6,128,562 A * 10/2000 Gering ........................ 701/45
6,157,880 A * 12/2000 de Mersseman et al. ..... 701/45
6,198,387 B1 * 3/2001 Dalum et al. ............... 340/436
6,236,308 B1 * 5/2001 Dalum ....................... 340/436
6,271,747 B1 * 8/2001 Fendt et al. ................ 340/436
6,301,535 B1 * 10/2001 Nusholtz et al. .............. 701/45

FOREIGN PATENT DOCUMENTS

| | | |
|---|---|---|
| DE | 197 51 336 | 6/1998 |
| EP | 0 982 199 | 2/2000 |
| EP | 1 026 052 | 8/2000 |
| JP | 10-152014 | 6/1998 |
| JP | 11170964 A | 6/1999 |
| JP | 11-286257 | 10/1999 |
| JP | 2000219098 A | 8/2000 |

OTHER PUBLICATIONS

International Preliminary Examination Report Feb. 5, 2002 in PCT/IB01/01753.

* cited by examiner

*Primary Examiner*—Richard M. Camry
*Assistant Examiner*—Tuan C To
(74) *Attorney, Agent, or Firm*—Kenyon & Kenyon

(57) ABSTRACT

An apparatus for controlling an output of an air bag device (30) such that the output is made relatively high when a deceleration value ($G_F$) detected by a floor sensor (14) disposed in a central portion of a vehicle body is higher than a threshold which changes with a velocity ($\int G_F \cdot dt$) which is obtained as a time integral of the deceleration value ($G_F$). The threshold is changed from a normally selected high value to a low value when one of two deceleration values ($G_{SL}$, $G_{SR}$) detected by respective two satellite sensors (16, 18) disposed in front left and right portions of the vehicle body has reached a threshold value which changes with the velocity ($\int G_F \cdot dt$).

16 Claims, 11 Drawing Sheets

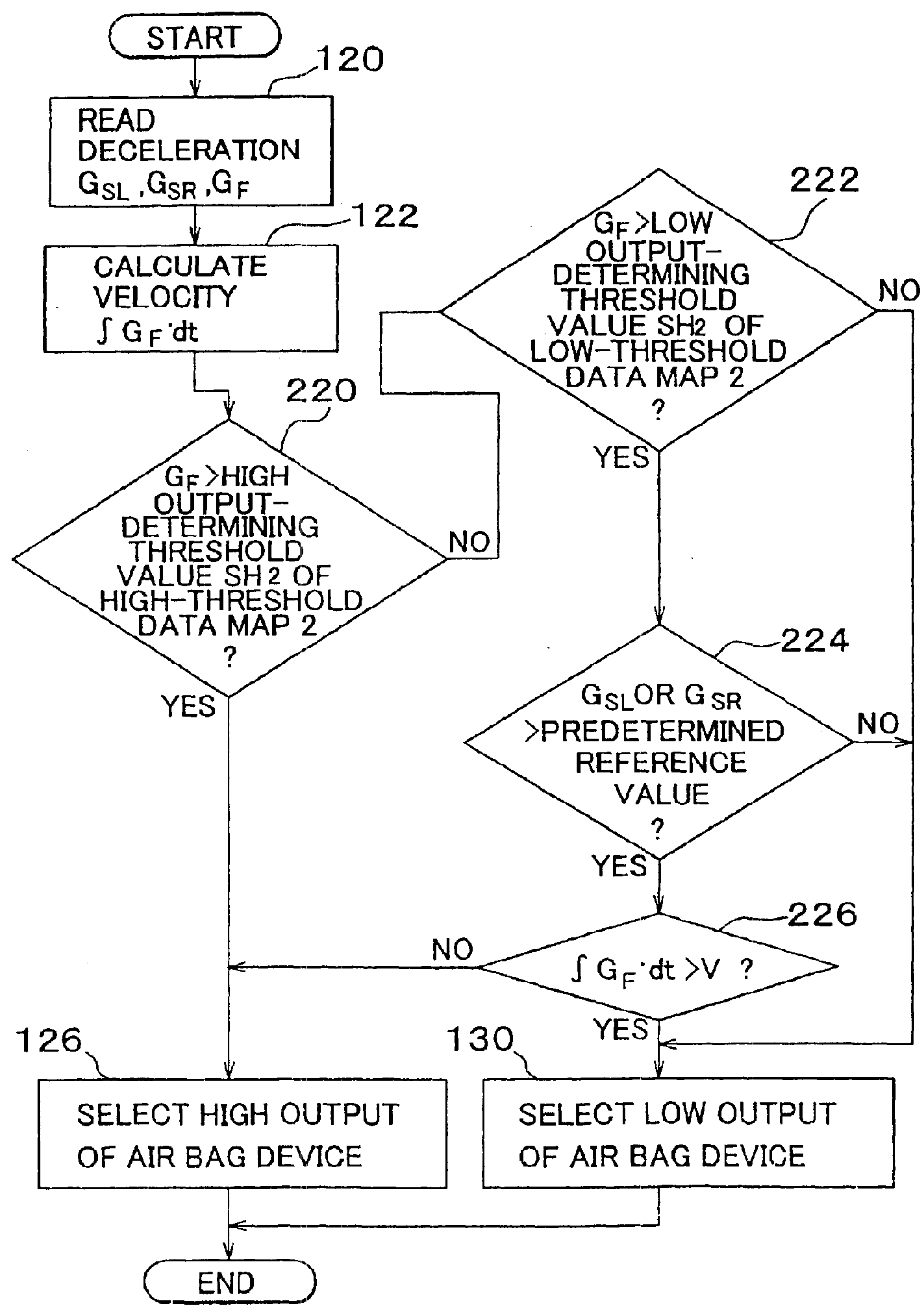
F I G. 12
START
120
READ DECELERATION $G_{SL}$, $G_{SR}$, $G_F$
122
CALCULATE VELOCITY $\int G_F \cdot dt$
220
$G_F$ >HIGH OUTPUT-DETERMINING THRESHOLD VALUE SH2 OF HIGH-THRESHOLD DATA MAP 2 ?
YES
NO
222
$G_F$ >LOW OUTPUT-DETERMINING THRESHOLD VALUE SH2 OF LOW-THRESHOLD DATA MAP 2 ?
YES
NO
224
$G_{SL}$ OR $G_{SR}$ >PREDETERMINED REFERENCE VALUE ?
YES
NO
226
$\int G_F \cdot dt > V$ ?
YES
NO
126
SELECT HIGH OUTPUT OF AIR BAG DEVICE
130
SELECT LOW OUTPUT OF AIR BAG DEVICE
END

APPARATUS AND METHOD FOR CONTROLLING ACTIVATION OF VEHICLE OCCUPANT PROTECTING DEVICE

FIELD OF THE INVENTION

The present invention relates to an apparatus and a method for controlling activation of a vehicle occupant protecting device, and more particularly to such a control apparatus suitably arranged to change an output of the vehicle occupant protecting device when the device is activated to protect an occupant (for example, an operator or a passenger) of the vehicle upon collision of the vehicle.

BACKGROUND OF THE INVENTION

JP-B2-2877145 discloses an example of a known apparatus for activating an air bag device such that the output of the activated air bag is suitably selectable between high and low values. This known apparatus uses a floor sensor disposed in a floor tunnel located in a central portion of an automotive vehicle, for detecting a deceleration value of the vehicle in its longitudinal direction, and calculating a value of a suitable control parameter on the basis of the detected vehicle deceleration value. The apparatus is arranged to select the high output or low output of the air bag device, according to a result of a comparison of the calculated the control parameter value with a predetermined threshold value. The known apparatus described above permits the air bag device to be activated so that the operator or passenger of the vehicle is effectively protected against an impact to be applied to the vehicle upon its collision.

However, the threshold value used to select the high or low output of the air bag device upon a head-on collision of the vehicle and that used upon an irregular collision of the vehicle should be different from each other. The use of a single threshold value in the known apparatus described above does not permit adequate selection of the output of the air bag device depending upon the type of the collision of the vehicle.

DISCLOSURE OF THE INVENTION

It is therefore an object of the present invention to provide a apparatus and a method for controlling an activation of a vehicle occupant protecting device, which apparatus permits an adequate control of the output of the protecting device upon activation of the device.

The object indicated above may be achieved according to a first aspect of this invention, which provides a control apparatus for controlling an output of a vehicle occupant protecting device upon activation of the protecting device, the control apparatus comprising a first sensor, output control means, a second sensor and threshold changing means.

The first sensor is disposed in a first portion of a body of a vehicle and is operable to generate an output signal corresponding to a degree of impact applied to the first portion of the vehicle body. The output control means is operable to control the output of the vehicle occupant protecting device such that the output is higher when a value of a parameter based on the output signal of the first sensor reaches a predetermined threshold value, than when the value of the parameter does not not reach the predetermined threshold value. The second sensor is disposed in a second portion of the vehicle body located in front of the first portion, and is operable to generate an output signal corresponding to a degree of impact applied to the second portion of the vehicle body. The threshold changing means is operable to change the predetermined threshold value depending upon whether a value of a parameter based on the output signal of the second sensor reaches a predetermined value.

In the control apparatus, the threshold value used to control the output of the vehicle occupant protecting device upon its activation is changed depending upon whether the value of the parameter based on the output signal of the second sensor located in front of the first sensor reaches the predetermined value. The output signal of the second sensor varies depending upon a type of a collision of the vehicle, even where the colliding speed is the same for different types of collision. The predetermined threshold value of the parameter based on the output signal of the first sensor, above which the output of the vehicle occupant protecting device should be made comparatively high, varies depending upon the type of the collision of the vehicle. Accordingly, the output of the vehicle occupant protecting device upon its activation can be suitable changed depending upon the type of the collision of the vehicle, by suitably determining the predetermined value indicated above, and the predetermined threshold value indicated above.

It is noted that a large impact is generally applied to only one of the front left and right portions of the vehicle body, in the event of an irregular collision of the vehicle. Therefore, the level of the output signal of the second sensor is higher in the event of the irregular collision than in the event of a head-on collision of the vehicle. Where the level of the output signal of the second sensor is relatively high due to the irregular collision of the vehicle, the threshold value used to control the output of the vehicle occupant protecting device is desirably made smaller than in the event of the head-on collision.

In view of the above, the threshold changing means of the control apparatus described above may be arranged to change the predetermined threshold value such that the predetermined threshold value is smaller when the value of the parameter based on the output signal of the second sensor reaches the predetermined value than when the value of the parameter based-on the output signal of the second sensor does not reach the predetermined value.

The object indicated above may also be achieved according to a second aspect of this invention, which provides a control apparatus for controlling an output of a vehicle occupant protecting device upon activation of the protecting device, the control apparatus comprising a first sensor, output control means and a second sensor.

The first sensor is disposed in a first portion of a body of a vehicle and is operable to generate an output signal corresponding to a degree of impact applied to the first portion of the body. The output control means is operable to control the output of the vehicle occupant protecting device such that the output is made relatively low when a value of a parameter based on the output signal of the first sensor don't reach a first threshold value, and is made relatively high when the value of the parameter reaches a second threshold value larger than the first threshold value. The second sensor is disposed in a second portion of the vehicle body located in front of the first portion, and is operable to generate an output signal corresponding to a degree of impact applied to the second portion. In the present control apparatus, the output control means is operable to control the output of the vehicle occupant protecting device depending upon whether the value of the parameter based on the output signal of the second sensor reaches a predetermined value, when the value of the parameter based on the output signal of the first sensor reaches the first threshold value but does not reach the second threshold value.

In the control apparatus described above, the output control means is arranged to control the output of the vehicle occupant protecting device such that the output is made relatively low when the value of the parameter based on the output signal of the first sensor does not reach the first threshold value, and is made relatively high when the value of the parameter reaches the second threshold value larger than the first threshold value. The output control means is further arranged to control the output of the vehicle occupant protecting device depending upon whether the value of the parameter based on the output signal of the second sensor reach the predetermined value, when the value of the parameter based on the output signal of the first sensor reaches the first threshold value but does not reach the second threshold value. The level of the output signal of the second sensor varies depending upon a type of a collision of the vehicle, even where the colliding speed is the same for different types of collision. The second threshold value of the parameter based on the output signal of the first sensor, above which the output of the vehicle occupant protecting device should be made relatively high, varies depending upon the type of the collision of the vehicle. Accordingly, the output of the vehicle occupant protecting device upon its activation can be suitable changed depending upon the type of the collision of the vehicle, by suitably determining the predetermined value indicated above, and the first and second threshold values indicated above.

The object indicated above may also be achieved according to a third aspect of the present invention, which provides a control apparatus for controlling an output of a vehicle occupant protecting device upon activation of the protecting device, the control apparatus comprising a first sensor, output control means, a second sensor and threshold changing means.

The first sensor is disposed in a first portion of a body of a vehicle and is operable to generate an output signal corresponding to a degree of impact applied to the first portion of the vehicle body. The output control means is operable to control the output of the vehicle occupant protecting device such that the output is higher when a value of a first parameter based on the output signal of the first sensor reaches a predetermined threshold value, than when the value of the first parameter does not reach the predetermined threshold value. The second sensor is posed in a second portion of the vehicle body located in front of the first portion, and is operable to generate an output signal corresponding to a degree of impact applied to the second portion. The output-threshold changing means is operable to change the predetermined threshold value, depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

In the control apparatus according to the third aspect of this invention, the threshold value used to control the output of the vehicle occupant protecting device is changed depending upon the relationship between the moment at which the degree of impact obtained based on the output signal of the second sensor located in front of the first sensor has reached the predetermined first reference value, and the moment at which the value of the second parameter based on the output signal of the first sensor has reached the predetermined second reference value. The threshold value for the first parameter based on the output signal of the first sensor varies depending upon the type of a collision of the vehicle. Namely, a threshold value of the first parameter used to set the output of the vehicle occupant protecting device to a relatively high value is different from a threshold vale of the first parameter used to set the output to a relatively low value. Since the degree of impact applied to the vehicle body increases with the colliding speed of the vehicle in the event of a given type of collision of the vehicle, the output of the protecting device is preferably made higher when the colliding speed is comparatively high than when the colliding speed is comparatively low. It is further noted that the amount of deformation of the vehicle body increases with an increase in the degree of impact applied to the vehicle body, so that the degree of impact applied to the front portion of the vehicle body has increased to a given value at a relatively early point of time when the colliding speed is comparatively high. Accordingly, the value of the second parameter based on the output signal of the first sensor is not so large, when the degree of impact applied to the front portion of the vehicle body has become relatively large, where the colliding speed is comparatively high. That is, the degree of impact applied to the front portion of the vehicle body has become relatively large before the value of the second parameter has become relatively large. Where the colliding speed is comparatively low, on the other hand, the value of the second parameter is relatively large when the degree of impact applied to the front portion of the vehicle body has become relatively large. That is, the degree of impact applied to the front portion of the vehicle body is not so large when the value of the second parameter has become relatively large. Accordingly, the output of the vehicle occupant protecting device can be suitably changed, depending upon the type of collision of the vehicle and the colliding speed, by suitably determining the predetermined first and second references values indicated above, and the predetermined threshold value indicated above.

In the control apparatus according to the third aspect of the invention, the threshold changing means may be arranged to change the predetermined threshold such that the predetermined threshold value is smaller when the value of the second parameter based the output signal of the first sensor has not reached the predetermined second reference value when the degree of impact obtained on the basis of the output signal of the second sensor, than when the value of the second parameter has reached the predetermined second reference value.

The object indicated above may also be achieved according to a fourth aspect of this invention, which provides a control apparatus for controlling an output of a vehicle occupant protecting device upon activation of the protecting device, the control apparatus comprising a first sensor, output control means and a second sensor.

The first sensor is disposed in a first portion of a body of a vehicle and operable to generate an output signal corresponding to a degree of impact applied to the first portion of the body. The output control means is operable to control the output of the vehicle occupant protecting device such that the output is made relatively low when a value of a first parameter based on the output signal of the first sensor does not reach a first threshold value, and is made relatively high when the value of the first parameter reaches a second threshold value larger than the first threshold value. The second sensor is disposed in a second portion of the vehicle body located in front of the first portion, and is operable to generate an output signal corresponding to a degree of impact applied to the second portion. When the value of the first parameter based on the output signal of the first sensor reaches the first threshold value but does not reach the second threshold value, the output control means controls the output of the vehicle occupant protecting device depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

In the control apparatus according to the fourth aspect of this invention, the output of the vehicle occupant protecting device is made relatively low when the value of the first parameter based on the output signal of the first sensor does not reach the first threshold value, and is made relatively high when the value of the first parameter reaches the second threshold value larger than the first threshold value. When the value of the first parameter based on the output signal of the first sensor reaches the first threshold value but does not reach the second threshold value, the output of the vehicle occupant protecting device is changed depending upon the relationship between the moment at which the degree of impact obtained on the basis of the output signal of the second sensor has reached the predetermined first reference value, and the moment at which the value of the second parameter based on the output signal of the first sensor has reached the predetermined second reference value.

The threshold value for the first parameter based on the output signal of the first sensor varies depending upon the type of a collision of the vehicle. That is, a threshold value of the first parameter used to set the output of the vehicle occupant protecting device to a relatively high value is different from a threshold vale of the first parameter used to set the output to a relatively low value. Since the degree of impact applied to the vehicle body increases with the colliding speed of the vehicle in the event of a given type of collision of the vehicle, the output of the protecting device is preferably made higher when the colliding speed is comparatively high than when the colliding speed is comparatively low. It is further noted that the amount of deformation of the vehicle body increases with an increase in the degree of impact applied to the vehicle body, so that the degree of impact applied to the front portion of the vehicle body has increased to a given value at a relatively early point of time when the colliding speed is comparatively high. Accordingly, the output of the vehicle occupant protecting device can be suitably changed, depending upon the type of collision of the vehicle and the colliding speed, by suitably determining the predetermined first and second references values indicated above, and the first and second threshold values indicated above.

A fifth aspect of the invention is a method for controlling an activating output of a vehicle occupant protecting device, wherein the vehicle includes: a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion. The method includes the steps of (a) determining whether a value of a parameter based on the output signal of the first sensor reaches a predetermined threshold value; (b) controlling the output of the vehicle occupant protecting device such that the output is higher when the value of a parameter based on the output signal of the first sensor reaches the predetermined threshold value, than when the value of the parameter does not reach the predetermined threshold value; and (c) changing the predetermined threshold value depending upon whether a value of a parameter based on the output signal of the second sensor reaches a predetermined value.

In the method according to the fifth aspect, the output of the vehicle occupant protecting device upon its activation can be suitable changed depending upon the type of the collision of the vehicle, by suitably determining the predetermined value indicated above, and the predetermined threshold value indicated above, similarly first aspect.

In the method according to the fifth aspect, it is preferred that the step of changing the predetermined threshold value includes changing the predetermined threshold value such that the predetermined threshold value is smaller when the value of the parameter based on the output signal of the second sensor reaches the predetermined value than when the value of the parameter based on the output signal of the second sensor does not reach the predetermined value, similarly first aspect.

A sixth aspect of the invention is a method for controlling an activating output of a vehicle occupant protecting device, wherein the vehicle includes: a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion. The method includes the steps of: (a) determining whether a value of a parameter based on the output signal of the first sensor does not reach a first threshold value (b) controlling the output of the vehicle occupant protecting device such that the output is made relatively low when it is determined that the value of the parameter based on the output signal of the first sensor does not reach the first threshold value, (c) determining whether the value of the parameter reaches a second threshold value larger than the first threshold value; (d) controlling the output of the vehicle occupant protecting device such that the output is made relatively high when the value of the parameter reaches the second threshold value; and (e) controlling the output of the vehicle occupant protecting device depending upon whether the value of the parameter based on the output signal of the second sensor reaches a predetermined value, when it is determined that the value of the parameter based on the output signal of the first sensor reaches the first threshold value but does not reach than the second threshold value.

In the method according to the sixth aspect, the output of the vehicle occupant protecting device upon its activation can be suitable changed depending upon the type of the collision of the vehicle, by suitably determining the predetermined value indicated above, and the first and second threshold values indicated above, similarly second aspect.

A seventh aspect of the invention is a method for controlling an activating output of a vehicle occupant protecting device, wherein the vehicle includes: a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion. The method includes (a) determining whether a value of a first parameter based on the output signal of the first sensor reaches a predetermined threshold value; (b) controlling the output of the vehicle occupant protecting device such that the output is higher when a value of a first parameter based on the output signal of the first sensor reaches a predetermined threshold value, than when the value of the first parameter does not reach the predetermined threshold value; (c) changing the predetermined threshold value, depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

In the method according to the seventh aspect, the output of the vehicle occupant protecting device can be suitably changed, depending upon the type of collision of the vehicle and the colliding speed, by suitably determining the predetermined first and second references values indicated above, and the predetermined threshold value indicated above, similarly third aspect.

In the method according to the seventh aspect, it is preferred that the step of changing the predetermined threshold value includes changing the predetermined threshold such that the predetermined threshold value is smaller when the value of the second parameter based the output signal of the first sensor has not reached the predetermined second reference value when the degree of impact obtained on the basis of the output signal of the second sensor, than when the value of the second parameter has reached the predetermined second reference value, similarly third aspect.

A eighth aspect of the invention is a method for controlling an activating output of a vehicle occupant protecting device, wherein the vehicle includes: a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion. The method includes the steps of: (a) determining whether a value of a first parameter based on the output signal of the first sensor does not reach a first threshold value; (b) controlling the output of the vehicle occupant protecting device such that the output is made relatively low when a value of a first parameter based on the output signal of the first sensor does not reach a first threshold value; (c) determining whether the value of the first parameter reach a second threshold value larger than the first threshold value; (d) controlling the output of the vehicle occupant protecting device such that the output is made relatively high when the value of the first parameter reach the second threshold value; and (e) controlling the output of the vehicle occupant protecting device depending upon a relationship between a moment at which the degree of impact obtained on the basis of the output signal of the second sensor has reached a predetermined first reference value, and a moment at which a value of a second parameter based on the output signal of the first sensor has reached a predetermined second reference value, when the value of the first parameter based on the output signal of the first sensor reaches the first threshold value but does not reach the second threshold value.

In the method according to the eighth aspect the output of the vehicle occupant protecting device can be suitably changed, depending upon the type of collision of the vehicle and the colliding speed, by suitably determining the predetermined first and second references values indicated above, and the first and second threshold values indicated above, similarly forth aspect.

BRIEF DESCRIPTION OF THE DRAWINGS

The above and other objects, features and advantages of this invention will be better become more apparent from the following detailed description of presently preferred embodiments of the invention, with reference to the accompanying drawings, in which like numerals are used to represent like elements and wherein:

FIG. 12 is a flow chart illustrating one example of a control routine executed by a control apparatus according to a fourth embodiment of this invention, to determine the output of the activated vehicle occupant protecting device.

DETAILED DESCRIPTION OF THE PREFERRED EMBODIMENTS

Figure 1:
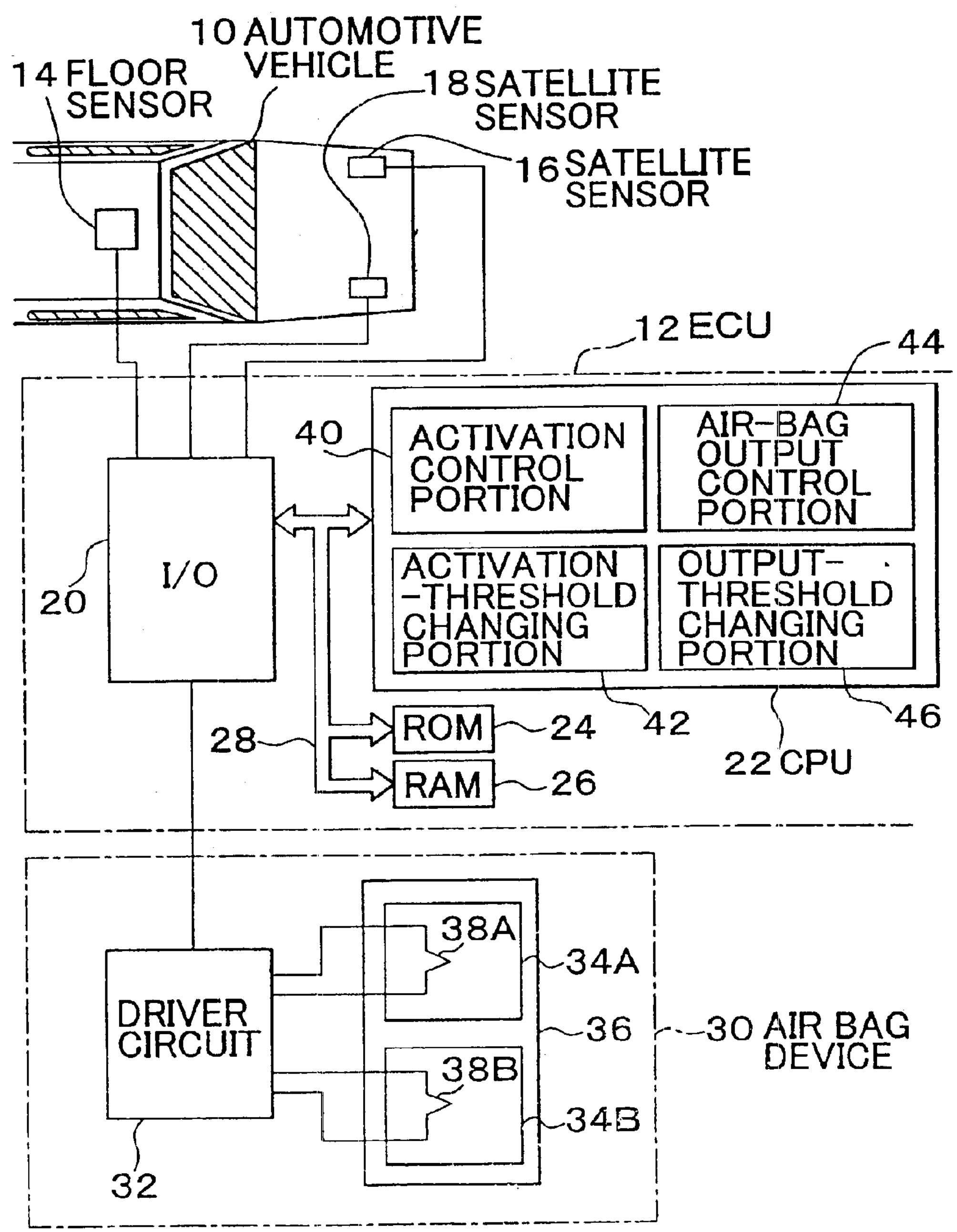
FIG. 1 is a view schematically showing a system including a vehicle occupant protecting device, and a control apparatus constructed according to one embodiment of this invention for controlling activation of the vehicle occupant protecting device.

Referring to the schematic view of FIG. 1, there are shown an occupant protecting device for an automotive vehicle, and one embodiment of a control apparatus of the present invention for controlling activation of the vehicle occupant protecting device. The control apparatus according to the present embodiment includes an electronic control unit (hereinafter abbreviated as "ECU") 12 installed on the automotive vehicle indicated at 10 in FIG. 1. The vehicle occupant protecting device in the form of an air bag device 30 installed on the vehicle 10 is controlled by the ECU 12. The control apparatus further includes a floor sensor 14 disposed near a floor tunnel located in a central portion of the vehicle body, and two satellite sensors 16, 18 which are disposed on respective left and right side members in respective front left and right portions of the vehicle body. Each of the floor sensor 14 and the satellite sensors 16, 18 is a deceleration sensor of electronic type arranged to generate an output signal corresponding to a magnitude of impact to be applied to the appropriate portion of the vehicle body in the longitudinal direction of the vehicle, more specifically, a deceleration value of the vehicle in the longitudinal direction as detected at the corresponding local portion of the vehicle body.

The ECU 12 incorporates an input-output circuit (hereinafter abbreviated as "I/O) 20, a central processing unit (hereinafter abbreviated as "CPU") 22, a read-only memory (hereinafter abbreviated as "ROM") 24 storing various control programs and data maps or tables used for arithmetic operations, a random-access memory (hereinafter abbreviated as "RAM") 26, and a bi-directional bus 28 by which the above-indicated elements 20, 22, 24 and 26 are interconnected to each other. The floor sensor 14 and satellite sensors 16, 18 indicated above are connected to the I/O 20, so that the output signals of those sensors 14, 16, 18 supplied to by the I/O 20 are stored in the RAM 26, as needed, under the control of the CPU 22. The ECU 12 is arranged to detect a deceleration value $G_F$ of the vehicle body at its central portion in the longitudinal direction, on the basis of the output signal of the floor sensor 14, and deceleration values $G_{SL}$, $G_{SR}$ of the vehicle body at its front left and right portions in the longitudinal direction, on the basis of the output signals of the satellite sensors 16, 18, respectively.

The air bag device 30 to be controlled by the control apparatus according to the present embodiment is installed on the vehicle 10, for protecting the vehicle operator or passenger. The air bag device 30 includes a driver circuit 32, two inflators 34A, 34B, and an air bag 36. The inflators 34A, 34B incorporate respective ignition devices 38A, 38B connected to the driver circuit 32, and respective masses of a gas-generating agent (not shown) each capable of generating a large volume of a gas for inflating the air bag 36. The air bag device 30 to be controlled by the control apparatus according to the present embodiment is arranged such that the air bag 36 is inflated with a comparatively high pressure when the two ignition devices 38A, 38B in the respective two inflators 34A, 34B are simultaneously energized or excited, and is inflated with a comparatively low pressure when the two ignition devices 38A, 38B are energized sequentially one after the other at a relatively short time interval. The air bag 36 is disposed so that the air bag 36, when inflated, is interposed between the vehicle operator or passenger and an internal component of the vehicle.

The driver circuit 32 of the air bag device 30 is connected to the I/O 20 of the ECU 12, so that the air bag device 30 is activated to inflate the air bag 36 when the driver circuit 32 receives a drive signal from the I/O 20. The CPU 22 of the ECU 12 includes an activation control portion 40, and an activation-threshold changing portion 12. The activation control portion 40 of the CPU 22 is arranged to perform processing operations as described below, according to control programs stored in the ROM 24.

The CPU 22 further includes an air-bag output control portion 44, and an output-threshold changing portion 46. The air-bag output control portion 44 is arranged to perform processing operations as described below, according to control programs stored in the ROM 24.

The processing operations to be performed by the CPU 22 will be described.

Figure 2:
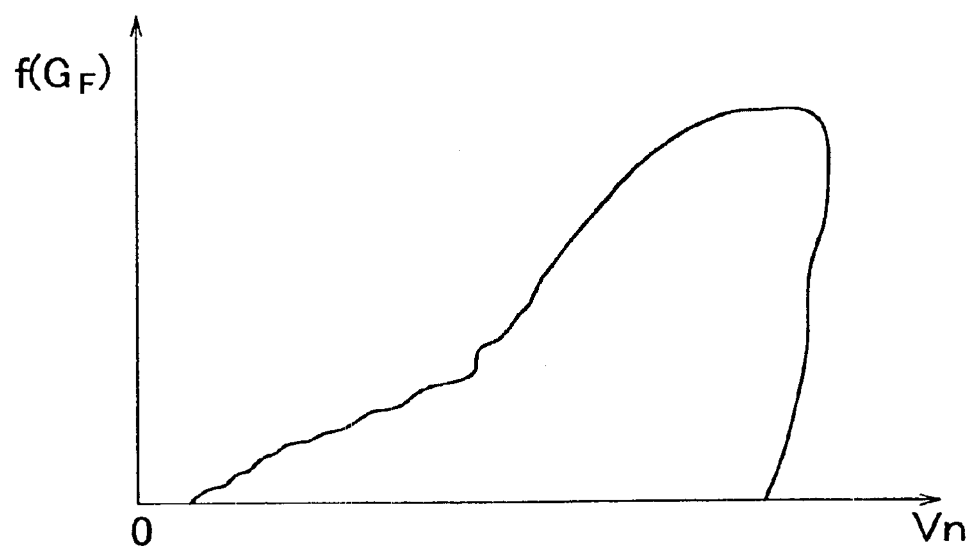
FIG. 2 is a plot showing a change with the time of a relationship between a calculated value $f(G_F)$ and a velocity Vn in a certain state of the vehicle.

First, there will be described the processing operations to be performed by the activation control portion 40 and the activation-threshold changing portion 42. In the present embodiment, the activation control portion 40 is arranged to effect a suitable processing of the deceleration value $G_F$ detected on the basis of the output signal of the floor sensor 14, to obtain a value of a suitable control parameter $f(G_F)$ and a velocity Vn. Described more specifically, the velocity Vn is a value obtained by integrating the deceleration value $G_F$ with respect to the time. Namely, when the running vehicle is decelerated with the deceleration value $G_F$, a mass within the vehicle body (e.g., a passenger aboard the vehicle) is accelerated due to an inertia, in the forward direction relative to the body of the vehicle 10. Therefore, the velocity Vn of the mass within the vehicle body relative to the vehicle body can be obtained as a time integral of the deceleration value $G_F$. The calculated control parameter value $f(G_F)$ may be the deceleration value $G_F$ per se. A plot in FIG. 2 shows a change with the time of a relationship between the calculated value $f(G_F)$ and the velocity Vn in a certain transient state of the vehicle. After the calculated value $f(G_F)$ and velocity Vn are obtained, the activation control portion 40 compares the obtained values $f(G_F)$ with a threshold value $SH_1$ represented by a data map which is selected or determined by the activation-threshold changing portion 42 as described below, wherein the compared values of the obtained value $f(G_F)$ and the threshold value $SH_1$ correspond to the same velocity Vn respectively.

Figure 3:
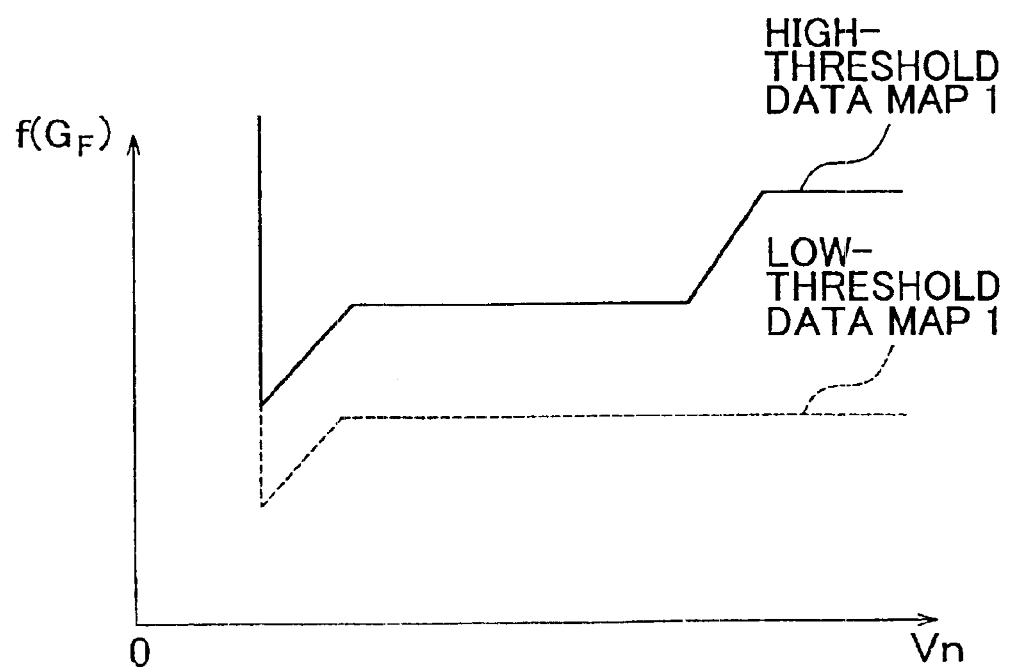
FIG. 3 is a graph indicating two lines of an activation threshold value for evaluating a point defined by the calculated $f(G_F)$ and the velocity Vn, which two lines are represented by respective data maps used in the embodiment of FIG. 1.

Referring to the graph of FIG. 3, there are shown two lines of the activation threshold value $SH_1$ which is compared with the value $f(G_F)$, wherein the compared values of the obtained value $f(G_F)$ and the threshold value $SH_1$ correspond to the same velocity Vn respectively. These two lines of the activation threshold value $SH_1$ (hereinafter referred to as "activation threshold lines", where appropriate) are represented by respective data maps, namely, a high-threshold data map 1 and a low-threshold data map 1. The high-threshold data map 1 represents the line of a high activation threshold value $SH_1$ (a reference threshold value) indicated by a solid line in FIG. 3, while the low-threshold data map 1 represents the line of a low activation threshold value $SH_1$ which is smaller than the high activation threshold value $SH_1$ and which is indicated by a broken line in FIG. 3.

In the present embodiment, the activation-threshold changing portion 42 selects one of the above-indicated high-threshold data map 1 and low-threshold data map 1 which respectively represent the two activation threshold lines shown in FIG. 3 by way of example and which are stored in the ROM 24. These activation threshold lines representing the threshold value $SH_1$ are obtained or determined by experimentation in relation to the calculated value $f(G_F)$ and velocity Vn such that the threshold value $SH_1$ for the value $f(G_F)$ changes as a function of the velocity Vn. Each of these two activation threshold lines defines a boundary which defines an activation region and a non-activation region of the point defined by the values $f(G_F)$ and Vn. Namely, when the point defined by the values $f(G_F)$ and Vn obtained upon application of an impact to the vehicle 10 lies in the activation region, the air bag device 30 is required to be activated. When the point lies in the non-activation region, the air bag device 30 is not required to be activated.

In the present embodiment, the activation-threshold changing portion 42 is arranged to select one of the two activation threshold lines, on the basis of the deceleration values $G_{SL}$, $G_{SR}$ represented by the output signals of the satellite sensors 16, 18, such that the threshold value $SH_1$ is made smaller when the detected deceleration value $G_{SL}$, $G_{SR}$ is larger than a predetermined reference value. Described in detail, the activation-threshold changing portion 42 selects the high-threshold data map 1 when the detected deceleration value $G_{SL}$, $G_{SR}$ is not larger than the reference value, and selects the low-threshold data map 1 when the detected deceleration value $G_{SL}$, $G_{SR}$ is larger than the reference value. That is, the possibility of collision of the vehicle 10 increases with an increase of the impact applied to the front portions of the vehicle, so that the need of activating the air bag device 30 increases with an increase of the deceleration value $G_{SL}$, $G_{SR}$. In view of this, the low-threshold data map 1 is selected when the deceleration value $G_{SL}$, $G_{SR}$ is higher than the reference value, so that the air bag device 30 can be easily activated. It is noted that the selection of one of the two lines of activation threshold is based on a higher one of the two deceleration values $G_{SL}$, $G_{SR}$.

The activation control portion 40 is arranged to compare the calculated value $f(G_F)$ with the activation threshold value $SH_1$ represented by the high-threshold or low-threshold data map 1 which is presently selected by the activation-threshold changing portion 42 as described above, wherein the compared values of the obtained value $f(G_F)$ and the threshold value SHI correspond to the same velocity Vn, respectively. Described in detail, the activation control portion 40 compares the obtained value $f(G_F)$ with the threshold value $SH_1$ on the selected activation threshold line, which value $SH_1$ corresponds to the obtained velocity Vn. Where the obtained value $f(G_F)$ is larger than the threshold value $SH_1$, the activation control portion 40 applies a drive signal to the driver circuit 32 through the I/O 20, so that the air bag device 30 is activated to inflate the air bag 36. Where the obtained value $f(G_F)$ is not larger than the threshold value $SH_1$ corresponding to the obtained velocity Vn, the activation control portion 40 inhibits the application of the drive signal from the I/O 20 to the driver circuit 32 of the air bag device 30.

The control apparatus according to the present embodiment permits the air bag device 30 to be activated on the basis of the degree of an impact to be applied to the central portion of the vehicle body. Further, the present control apparatus assures adequate activation of the air bag device 30 such that the chance of activation of the air bag device 30 increases with an increase in the degree of the impact to be applied to the front portions of the vehicle body.

Then, the operations to be performed by the air-bag output control portion 44 and the output-threshold changing portion 46 will be described.

Figure 4:
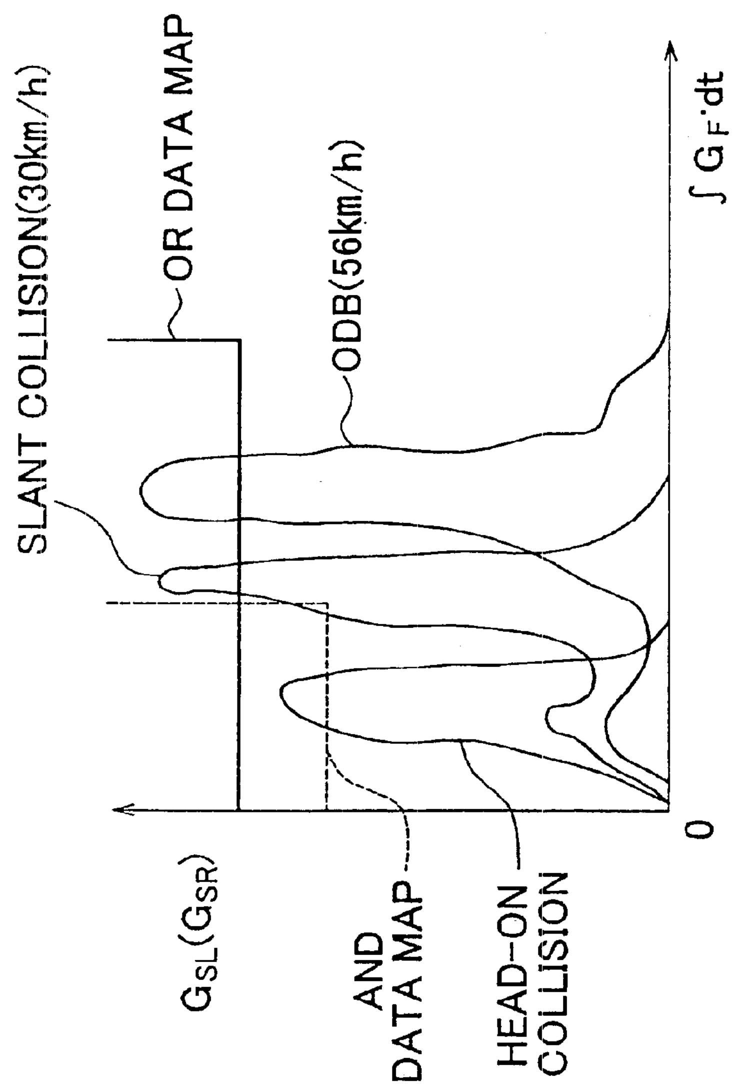
FIG. 4 is a plot showing changes with the time of relationships between a deceleration value $G_{SL}$, $G_{SR}$ and a velocity $\int G_F \cdot dt$, which relationships correspond to respective different types of collision of the vehicle.
Figure 5:
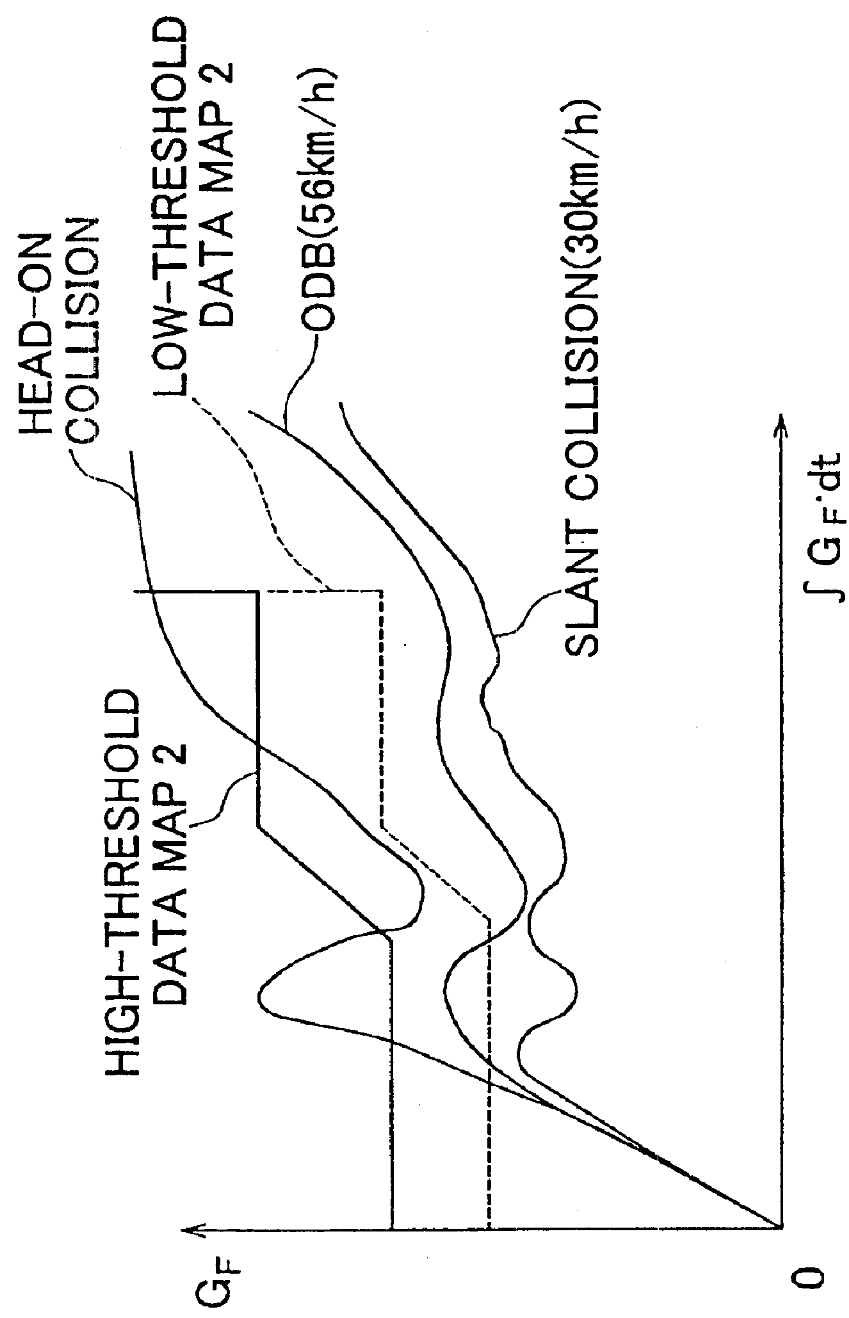
FIG. 5 is a plot showing changes with the time of relationships between a deceleration value $G_F$ and the velocity $\int G_F \cdot dt$, which relationships correspond to the respective different types of collision of the vehicle.

Referring to a plot of FIG. 4, there are shown three relationships between the deceleration value $G_{SL}$, $G_{SR}$ and a velocity $\int G_F \cdot dt$, which change with the time and which correspond to respective different types of collision of the vehicle. FIG. 4 further shows a line of an output-determining threshold value $SH_3$ used to evaluate a point defined by the deceleration value $G_{SL}$, $G_{SR}$ and the velocity $\int G_F \cdot dt$, to determine the output of the activated air bag device 30. This line of the output-determining threshold value $SH_3$, which is indicated by a broken line in FIG. 4, is represented by a data map (hereinafter referred to as "AND data map"). FIG. 4 further shows a line of an output-threshold determining threshold value $SH_4$ used to evaluate the point defined by the deceleration value $G_{SL}$, $G_{SR}$ and the velocity $\int G_F \cdot dt$, to determine a threshold value $SH_2$ also used to determine the output of the activated air bag device 30. This line of the output-threshold determining threshold value $SH_4$, which is indicated by a solid line in FIG. 4, is represented by another data map (hereinafter referred to as "OR data map"). FIG. 5 shows two lines of the output-determining threshold value $SH_2$ with which a point defined by the deceleration value $G_F$ and the velocity $\int G_F \cdot dt$ is compared. These two lines of the output-determining threshold value $SH_2$ (hereinafter referred to as "output threshold lines", where appropriate) are represented by respective data maps, namely, a high-threshold data map 2 and a low-threshold data map 2. The high-threshold data map 2 represents the line of a high output-determining threshold value $SH_2$ (a reference threshold value) indicated by a solid line in FIG. 5, while the low-threshold data map 2 represents the line of a low output-determining threshold value $SH_2$ which is smaller than the high output-determining threshold value $SH_2$ and which is indicated by a broken line in FIG. 5.

In the present embodiment, the air-bag output control portion 44 determines the output of the activated air bag device 30 on the basis of the deceleration value $G_{SL}$, $G_{SR}$ and the velocity $\int G_F \cdot dt$ and according to the AND data map which represents the line of the output-determining threshold value $SH_3$, and on the basis of the deceleration value $G_F$ and the velocity $\int G_F \cdot dt$ and according to the high-threshold or low-threshold data map 2 which represents the high or low output-determining threshold value $SH_2$ and which is selected by the output-threshold changing device 46. Those AND data map and high-threshold and low-threshold data maps 2 are stored in the ROM 24, and the lines of the threshold values $SH_3$ and $SH_2$ represented by those data maps are indicated in FIGS. 4 and 5 by way of example, and are obtained or determined by experimentation in relation to the deceleration value $G_{SL}$, $G_{SR}$ and velocity $\int G_F \cdot dt$, and in relation to the deceleration value $G_F$ and the velocity $\int G_F \cdot dt$, such that the threshold value $SH_3$ for the deceleration value $G_{SL}$, $G_{SR}$ and the threshold value $SH_2$ for the deceleration value $G_F$ change as a function of the velocity $\int G_F \cdot dt$. On the other hand, the output-threshold changing portion 46 selects one of the high-threshold data map 2 and the low-threshold data map 2, on the basis of the deceleration value $G_{SL}$, $G_{SR}$ and velocity $\int G_F \cdot dt$, and according to the OR data map which is stored in the ROM 24 and which represents the line of the output-threshold determining threshold value $SH_4$ as shown in FIG. 4 by way of example. This line of the output-threshold determining threshold value $SH_4$ is also obtained or determined by experimentation in relation to the deceleration value $G_{SL}$, $G_{SR}$ and velocity $\int G_F \cdot dt$, such that the threshold value $SH_4$ for the deceleration value $G_{SL}$, $G_{SR}$ changes as a function of the velocity $\int G_F \cdot dt$. The line of the output-determining threshold value $SH_3$ represented by the AND data map and the lines of the high and low output-determining threshold values $SH_2$ represented by the high- and low-output data maps 2 define boundaries used by the air-bag output control portion 44 to select one of high and low output values of the air bag device 30 upon activation of the air bag device 30. The line of the output-threshold determining threshold value $SH_4$ defines a boundary used by the output-threshold changing portion 46 to select one of the high-threshold and low-threshold data maps 2.

As described below in detail, the present control apparatus is arranged to activate the air bag device 30 so as to provide a comparatively high output where the central portion of the vehicle in which the vehicle operator and/or passengers is/are present receives a comparatively large impact upon head-on collision of the vehicle 10, and so as to provide a comparatively low output where the central portion receives a comparatively small impact upon the head-on collision. Thus, the output of the air bag device 30 upon its activation is suitably determined or adjusted. The present control apparatus is further arranged to activate the air bag device 30 so as to provide a comparatively high output where both the front left and right portion of the vehicle body receive a comparatively large degree of impact, which causes a comparatively large degree of impact to be applied to the central portion of the vehicle body.

Figure 6:
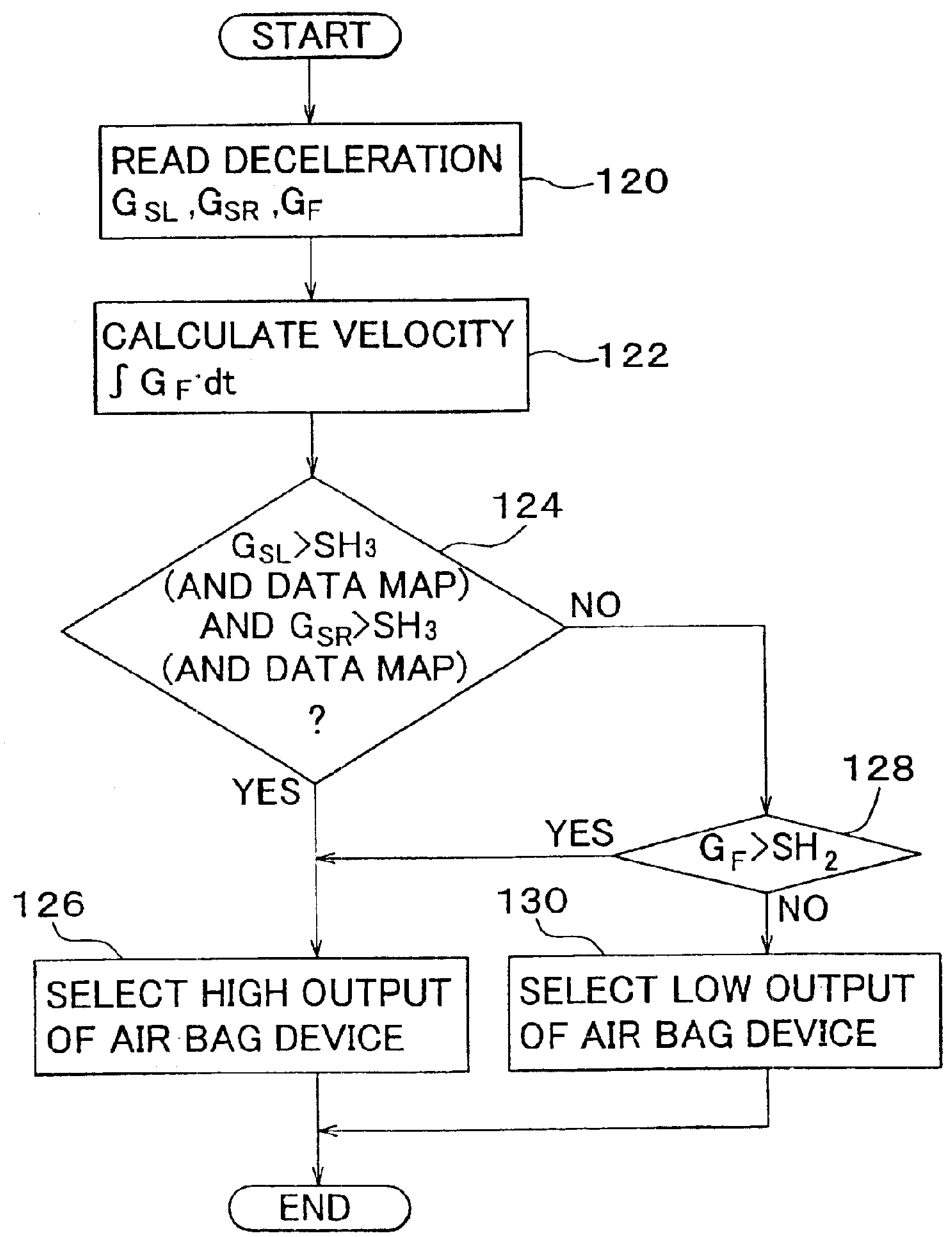
FIG. 6 is a flow chart illustrating one example of a control routine executed by the control apparatus of FIG. 1, to determine the output of the vehicle occupant protecting device upon activation of the protecting device.

Referring to the flow chart of FIG. 6, there is illustrated an example of a control routine executed by the air-bag output control portion 44 of the ECU 12, to determine the output of the air bag device 30 upon its activation. The control routine of FIG. 6 is repeatedly executed with a predetermined cycle time. Each cycle of execution of this control routine is initiated with step 120.

In step 120 which is similar to step 100 in a control routine of FIG. 7 (which will be described), the air-bag output control portion 44 obtains the deceleration values $G_{SL}$ and $G_{SR}$ on the basis of the output signals of the satellite sensors 16, 18, and the deceleration value $G_F$ on the basis of the floor sensor 14.

Figure 7:
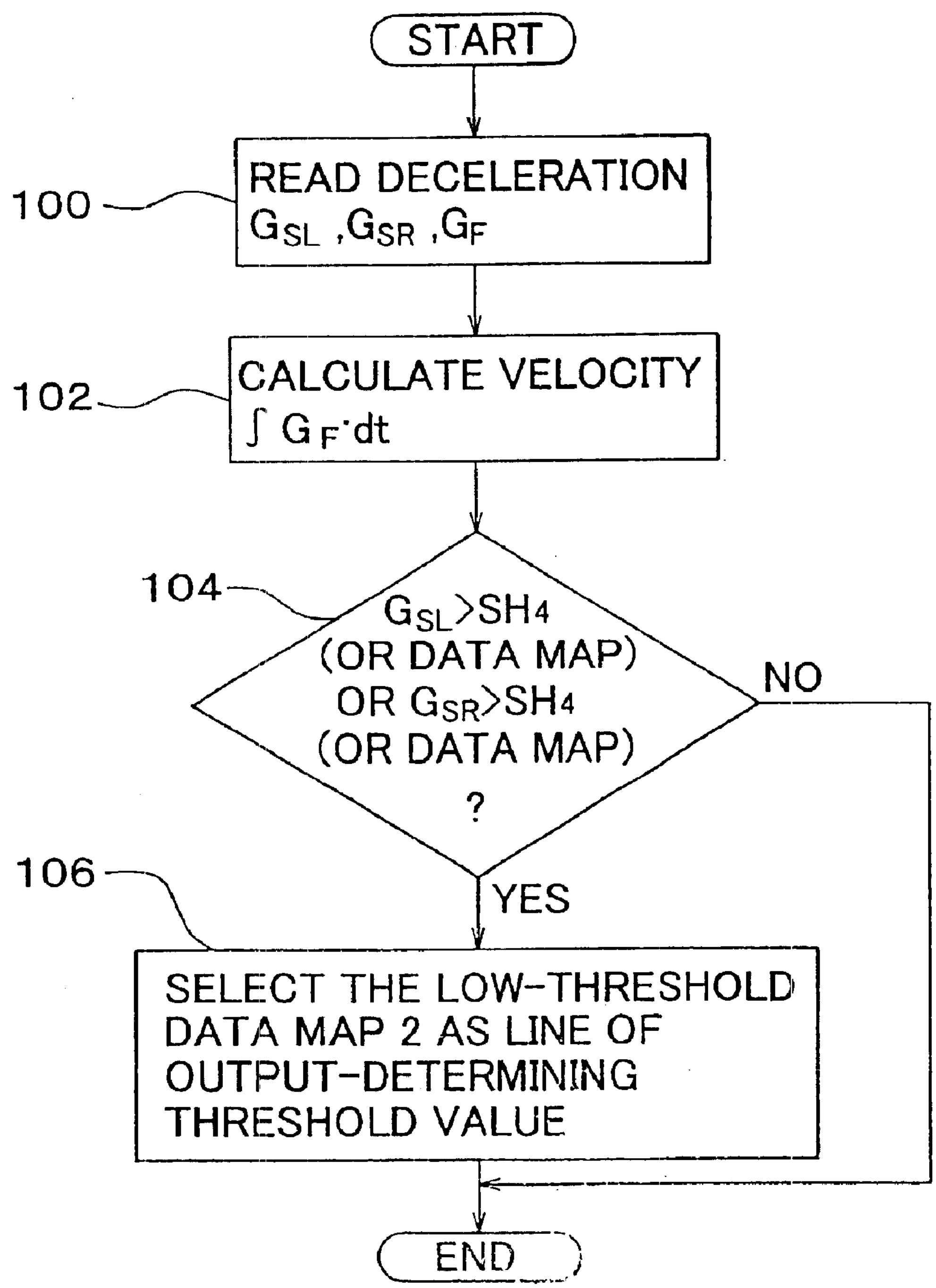
FIG. 7 is a flow chart illustrating one example of a control routine executed by the control apparatus of FIG. 1, to select a line of an output-determining threshold value used for determining the output of the activated vehicle occupant protecting device.

The control flow then goes to step 122 similar to step 102 of FIG. 7, to calculate the velocity $\int G_F \cdot dt$ by integrating the deceleration value $G_F$ with respect to the time.

Step 122 is followed by step 124 to determine whether both of the deceleration values $G_{SL}$ and $G_{SR}$ are higher than the output-determining threshold value $SH_3$ represented by the AND data map. That is, when $G_{SL}>SH_3$ and when $G_{SR}>SH_3$, both of the front left and right portions of the vehicle body receive comparatively large degrees of impact. In this case, an affirmative decision (YES) is obtained in step 124, and the control flow goes to step 126.

Step 126 is provided to perform an operation to set the output of the air bag device 30 to the high value. When the air bag device 30 is activated after step 126 is implemented, the air-bag output control portion 44 applies to the driver circuit 32 through the I/O 20 a drive signal for energizing both of the ignition devices 38A, 38B in the respective inflators 34A, 34B, substantially concurrently. In this case, the inflators 34A, 34B are substantially concurrently operated to generate a gas, so that the air-bag 36 is inflated with a comparatively high pressure of the gas. Once the output of the air bag device 30 is set to the high value, this setting is maintained for a predetermined length of time. In the above case, one cycle of execution of the control routine of FIG. 6 is terminated upon completion of step 126.

Where the inequality $G_{SL}>SH_3$ or the inequality $G_{SR}>SH_3$ is not satisfied, a negative decision (NO) is obtained in step 124, and the control flow goes to step 128.

Step 128 is provided to determine whether the deceleration value $G_F$ obtained in step 120 is higher than the output-determining threshold value $SH_2$ which has been determined by execution of a control routine of FIG. 7 by the output-threshold changing portion 44, which will be described. If the inequality $G_F>SH_2$ is satisfied, an affirmative decision (YES) is obtained in step 128, and the control flow goes to the step 126 described above. If the inequality is not satisfied, a negative decision (NO) is obtained in step 128, and the control flow goes to step 130.

Step 130 is provided to perform an operation to set the output of the air bag device 30 to the low value. When the air bag device 30 is activated after step 130 is implemented, the air-bag output control portion 44 applies to the driver circuit 32 through the I/O 20 a drive signal for sequentially energizing the ignition devices 38A, 38B in the respective inflators 34A, 34B, one after the other at a predetermined relatively short time interval. In this case, the inflators 34A, 34B are sequentially operated one after the other to generate a gas, so that the air-bag 36 is inflated with a comparatively low pressure of the gas. If the output of the air bag device 30 is set in step 130 to the low value after the output has been set to the high value in step 126, the setting of the high output value is maintained for a predetermined length of time. One cycle of execution of the control routine of FIG. 6 is also terminated upon completion of step 130.

According to the operations of the air-bag output control portion 44, the output of the air bag device 30 is set to the high value where the front left and right portions of the vehicle body both receive a comparatively large degree of impact, or where the central portion of the vehicle body receives a comparatively large degree of impact, with the deceleration value $G_F$ reaching the output-determining threshold value $SH_2$ represented by the high-threshold or low-threshold data map 2 selected by the control routine of FIG. 7 (described below in detail). Accordingly, the present control apparatus permits adequate determination of the output of the air bag device 30 activated upon the head-on collision or an ODB-type offset collision of the vehicle 10. Namely, the present control apparatus permits the output of the air bag device 30 to be adjusted to as to meet the specific type of collision of the vehicle 10. Accordingly, the present control apparatus is capable of controlling the activation of the air bag device 30, so as to effective protect the operator or passenger of the vehicle 10 depending upon the specific type of collision of the vehicle.

It is noted that the offset collisions of the vehicle include an offset collision of an ORB ("Offset Rigid Barrier") type, and an offset collision of the above-indicated ODB ("Offset Deformable Barrier") type. The offset collision of the ODB type involves deformation of the barrier with which the vehicle 10 collides, so that the impact to be applied to the central portion of the vehicle body during the ODB type offset collision is smaller than that during the bead-on collision. However, the output of the air bag device 30 may be required to be set to the high value under some condition of the ODB type offset collision (for instance, in the case of the ODB type offset collision at the vehicle speed of 56 km/h as indicated in the plots of FIGS. 4 and 5).

If the high-threshold data map 2 representing the line of the high output-determining threshold value $SH_2$ is selected during the offset collision of the ODB type at the vehicle speed of 56 Km/h, the point defined by the deceleration value $G_F$ and the velocity $\int G_F \cdot dt$ is less likely to reach the line of the high output determining threshold value $SH_2$ represented by the high-threshold data map 2. In the offset collision in which either one of the front left and right portions of the vehicle body receives a considerably large degree of impact, the deceleration value $G_{SL}$ or $G_{SR}$ as detected by the corresponding satellite sensor 16, 18 is relatively high. However, both of the point defined by the deceleration value $G_{SL}$ and the velocity $\int G_F \cdot dt$ and the point defined by the deceleration value $G_{SR}$ and the velocity $\int G_F \cdot dt$ will not reach the line of the output-determining threshold value $SH_3$ represented by the AND data map. To set the output of the air bag device 30 to the high value in the event of the offset collision of the ODB type, therefore, it is effective to select the low-threshold data map 2 representing the line of the low output-determining threshold value $SH_2$ lower than the high output-determining threshold value $SH_2$ represented by the high-threshold data map 2

In view of the above, the output-threshold changing portion 46 of the present control apparatus is arranged to perform the following operation for determining the output threshold line of the output-determining threshold value $SH_2$, while taking into account the offset collision of the ODB type.

Referring to the flow chart of FIG. 7, there is illustrated an example of a control routine executed by the output-threshold changing portion 46 of the ECU 12 to determine the output threshold line of the output-determining threshold value $SH_2$. The control routine of FIG. 7 is repeatedly executed with a predetermined cycle time. Each cycle of execution of this control routine is initiated with step 100.

In step 100, the output-threshold changing portion 46 obtains the deceleration values $G_{SL}$ and $G_{SR}$ at the respective front left and right portions of the vehicle body in the longitudinal direction of the vehicle 10, on the basis of the output signals of the satellite sensors 16, 18, and further obtains the deceleration value $G_F$ at the central portion of the vehicle body in the longitudinal direction of the vehicle 10, on the basis of the floor sensor 14.

The control flow then goes to step 102 to calculate the velocity $\int G_F \cdot dt$ by integrating the deceleration value $G_F$ (obtained in step 100 with respect to the time.

Step 102 is followed by step 104 to determine whether either one of the deceleration values $G_{SL}$ and $G_{SR}$ is higher than the output-determining threshold value $SH_4$ represented by the OR data map of FIG. 4. That is, when one of the inequality $G_{SL}>SH_4$ and the inequality $G_{SR}>SH_3$ is satisfied, there is a possibility that the vehicle 10 is in an offset collision of the ODB type at a speed of 56 km/h or so. In this case, the output of the air bag device 30 is required to be set to the high value, and the control flow goes to step 106.

Step 106 is provided to perform an operation to select the low-threshold data map 2 of FIG. 5 which represents the line of the low output-determining threshold value $SH_2$. After this step 106 is implemented, the deceleration value $G_F$ (represented by the output signal of the floor sensor 14) is compared, in step 128, with the threshold value $SH_2$ represented by the low-threshold data map 2, to determine the output of the air bag device 30 upon its activation, wherein the compared values of the deceleration value $G_F$ and the threshold value $SH_2$ correspond to the same velocity $\int G_F \cdot dt$, respectively. One cycle of execution of the control routine of FIG. 6 is terminated upon completion of step 106.

Once the inequality $G_{SL}>SH_4$ or the inequality $G_{SR}>SH_4$ has been satisfied, the selection of the low-threshold data map 2 is maintained even if none of those inequalities is satisfied in the present cycle. If the inequality $G_{SL}>SH_4$ or the inequality $G_{SR}>SH_4$ has never been satisfied, that is, if a negative decision (NO) is obtained in step 104 in the present cycle without an affirmative decision (YES) obtained in the past cycles, this means that the selection of the low-threshold data map 2 is not required, but the selection of the high-threshold data map 2 is required to be maintained. In this case, therefore, one cycle of execution of the control routine of FIG. 7 is terminated, without implementing step 106.

In a slant collision of the vehicle 10 at a colliding speed around 30 km/h, a considerable degree of impact is applied to one of the front left and right portions of the vehicle body, as in the offset collision of the ODB type at the colliding speed of 56 km/h. Accordingly, the line defined by the velocity $\int G_F \cdot dt$ and the deceleration value $G_{SL}$ and the line defined by the velocity and the deceleration value $G_{SR}$ in the slant collision are relatively close to the line in the ODB type offset collision, as indicated in the graph of FIG. 4. However, it is desired to set the output of the activated air bag device 30 to the low value in the slant collision of the vehicle 10 at the colliding speed around 30 km/h. In view of this, the low-threshold data map 2 representing the low output-determining threshold value $SH_2$ is formulated such that the output of the activated air bag device 30 is made low in the slant collision at the colliding speed around 30 km/h, while the output is made high in the ODB type offset collision at the colliding speed around 56 km/h, as is apparent from the line of the low output-determining threshold value SH2 indicated in the graph of FIG. 5.

In the control apparatus described above, the air-bag output control portion 44 is arranged to set the output of the air bag device 30 to the high value when one of the deceleration values $G_{SL}$ and $G_{SR}$ detected based on the output signals of the satellite sensors 16, 18 is higher than the threshold value $SH_4$ which is represented by the OR data map and which correspond to the velocity $\int G_F \cdot dt$ detected based on the output signal of the floor sensor 14, and when the detected deceleration value $G_F$ is higher than the threshold value $SH_2$ which is represented by the low-threshold data map 2 and which corresponds to the detected velocity $\int G_F \cdot dt$. The air-bag output control portion 44 is further arranged to set the output of the air bag device 30 to the low value when the detected deceleration value $G_F$ is not higher than the threshold value $SH_2$ which is represented by the low-threshold data map 2 and which corresponds to the detected velocity $\int G_F \cdot dt$, even when one of the detected deceleration values $G_{SL}$ and $G_{SR}$ is higher than the threshold value $SH_4$ which is represented by the OR data map and which correspond to the detected velocity $\int G_F \cdot dt$.

As described above, the present control apparatus is arranged to select the low-threshold data map 2 which represents the line of the low output-determining threshold value $SH_2$, when a considerable degree of impact is applied to one of the front left and right portions of the vehicle body.

Accordingly, the control apparatus according to the present invention permits the output of the activated air bag device 30 to be set to the high value in the event of the ODB type offset collision, even where the degree of impact to be applied to the central portion of the vehicle body is relatively small, and to the low value in the event of the slant collision. Thus, the present arrangement permits an adequate change of the output of the air bag device 30 between the high and low values, depending upon the type of the collision of the vehicle 10.

It will be understood from the foregoing description of the present first embodiment that the air bag device 30 corresponds to a vehicle occupant protecting device, and the floor sensor 14 corresponds to a first sensor, while the deceleration value $G_F$ represented on the line defined by the deceleration value $G_F$ obtained on the basis of the output signal of the floor sensor 14 and the velocity $\int G_F \cdot dt$ obtained as a time integral of the deceleration value $G_F$ correspond to a parameter obtained on the basis of the output signal of the first sensor. It will also be understood that the satellite sensors 16, 18 correspond to a second sensor, and the deceleration value $G_{SL}$, $G_{SR}$ represented on the line defined by the deceleration value $G_{SL}$, $G_{SR}$ obtained on the basis of the output signal of the satellite sensor 16, 18 and the velocity $\int G_F \cdot dt$ obtained as a time integral of the deceleration value $G_F$ obtained on the basis of the output signal of the floor sensor 14 correspond to a parameter obtained on the basis of the output signal of the second sensor.

It will further be understood that a portion of the ECU 12 assigned to implement step 126 after the implementation of step 128 in the first embodiment constitutes output control means, while a portion of the ECU 12 assigned to implement step 106 in response to a result of determination in step 104 constitutes threshold changing means.

Figure 8:
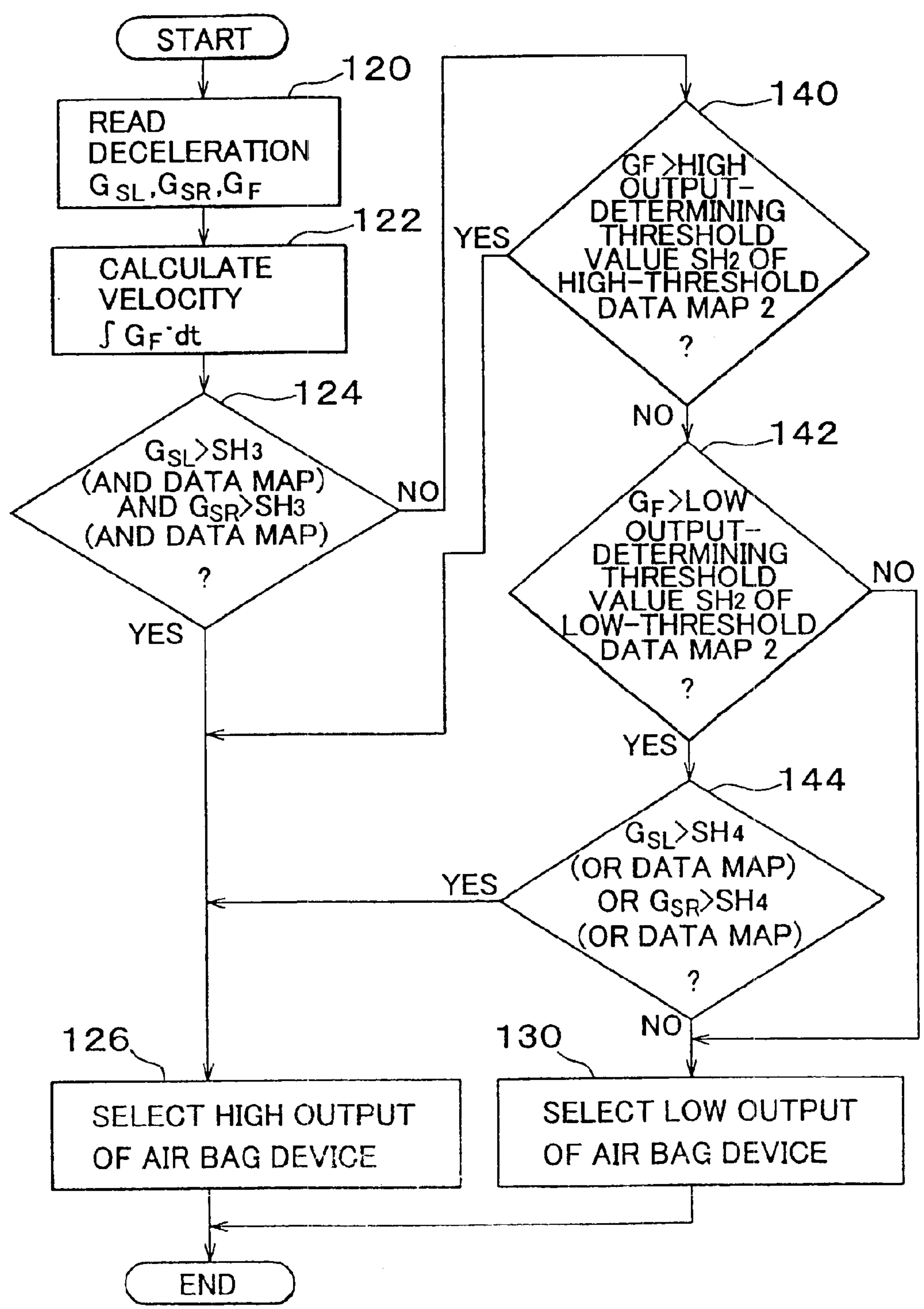
FIG. 8 is a flow chart illustrating one example of a control routine executed by a control apparatus according to a second embodiment of this invention, to determine the output of the activated vehicle occupant protecting device.

Referring next to FIG. 8 as well as FIGS. 1 and 6, there will be described a second embodiment of the present invention. In the control apparatus according to this embodiment, which is arranged to control the activation of the vehicle occupant protecting device shown in FIG. 1, the ECU 12 is arranged to execute a control routine shown in FIG. 8.

The control routine illustrated in the flow chart of FIG. 8 by way of example is executed by the ECU 12 to determine the output of the air bag device 30 when the air bag device 30 is activated. This control routine is repeatedly executed with a predetermined cycle time. The same step numbers as used in the control routine of FIG. 6 will be used in FIG. 8, to identify the same steps, and description of these steps in FIG. 8 is omitted or simplified. When the negative decision (NO) is obtained in step 124 in the control routine of FIG. 8, the control flow goes to step 140.

Step 140 is provided to determine whether the deceleration value $G_F$ obtained in step 120 is higher than the threshold value $SH_2$ represented by the high-threshold data map 2. If it is determined in step 140 that the inequality $G_F>SH_2$ is satisfied, it means that a relatively large degree of impact is applied to the central portion of the vehicle body, so that the output of the air bag device 30 is required to be set to the high value. Therefore, when it is determined in step 140 that the inequality $G_F>SH_2$ is satisfied, the control flow goes to the step 126 indicated above, to set the output of the activated air bag device 30 to the high value. If it is not determined in step 140 that the inequality $G_F>SH_2$ is satisfied, the control flow goes to step 142.

Step 142 is provided to determine whether the deceleration value $G_F$ is higher than the threshold value $SH_2$ represented by the low-threshold data map 2. If it is determined in step 142 that the inequality $G_F>SH_2$ is satisfied, it means that a determination as to whether the vehicle 10 has undergone the ODB type offset collision can be made by determining whether a considerably large degree of impact is applied to one of the front left and right portions of the vehicle body. If the considerably large degree of impact is applied to the front left or right portion of the vehicle, it is required to set the output of the activated air bag device 30 to the high value. Therefore, if it is determined in step 142 that the inequality $G_F>SH_2$ is satisfied, the control flow goes to step 144. If it is not determined in step 142 that the inequality $G_F>SH_2$ is satisfied, it means that the degree of impact applied to the central portion of the vehicle is not so large, and the output of the air bag device 30 is not required to be set to the high value. In this latter case, therefore, step 142 is followed by the above-described step 130 to set the output of the air bag device 30 to the low value.

Step 144 is provided to determine whether one of the deceleration values $G_{SL}$, $G_{SR}$ is higher than the threshold value $SH_4$ represented by the OR data map. If one of the inequalities $G_{SL}>SH_4$ and $G_{SR}>SH_4$ is satisfied, it is possible to determine that the vehicle 10 has undergone the ODB type offset collision at the colliding speed around 56 km/h. Therefore, if it is determined in step 144 that one of those two inequalities is satisfied, the control flow goes to the above-described step 126 to set the output of the air bag device 30 to the high value. If none of the inequalities $G_{SL}>SH_4$ and $G_{SR}>SH_4$ is satisfied, it is possible to determine that the vehicle 10 has not undergone the ODB type offset collision at the colliding speed around 56 km/h. In this case, therefore, the control flow goes to the above-described step 130 to set the output of the air bag device 30 to the low value.

According to the arrangement described above, the output of the air bag device 30 upon its activation is set to the high value when relatively large degrees of impact are applied to both of the front left and right portions of the vehicle body, when a considerably large degree of impact is applied to the central portion of the vehicle body, or when a considerably large degree of impact is applied to one of the front left and right portions of the vehicle body while a relatively large degree of impact is applied to the central portion of the vehicle body. Namely, the present control apparatus is arranged to set the output of the air bag device 30 to the high value in the event of the ODB type offset collision even where the impact applied to the central portion of the vehicle body is not so large. Thus, the present control apparatus permits an adequate change of the output of the air bag device 30 depending upon the type of the collision of the vehicle 10. Therefore, the present control apparatus also permits the air bag device 30 to effectively protect the vehicle operator or passenger in the event of a collision of the vehicle 10, depending upon the type of the collision.

In the second embodiment described above, the threshold value $SH_2$ represented by the low-threshold data map 2 corresponds to a first threshold value, and the threshold value $SH_2$ represented by the high-threshold data map 2 corresponds to a second threshold value, while the threshold value $SH_4$ represented by the OR data map corresponds to a predetermined value. Further, a portion of the ECU 12 assigned to implement the above-described steps 126, 130 and 140–144 constitutes an output control means.

Figure 9:
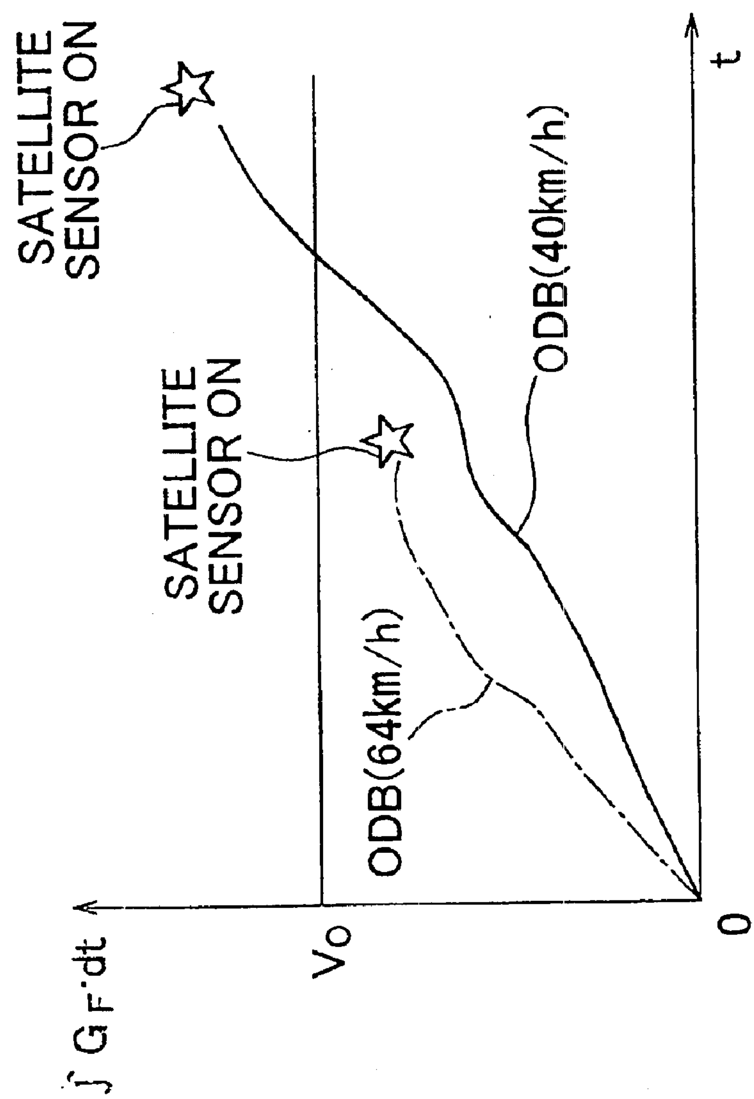
FIG. 9 is a graph showing changes of the velocity $\int G_F \cdot dt$ with the time in two cases of ODB collision of the vehicle having respective different degrees of impact.
Figure 10:
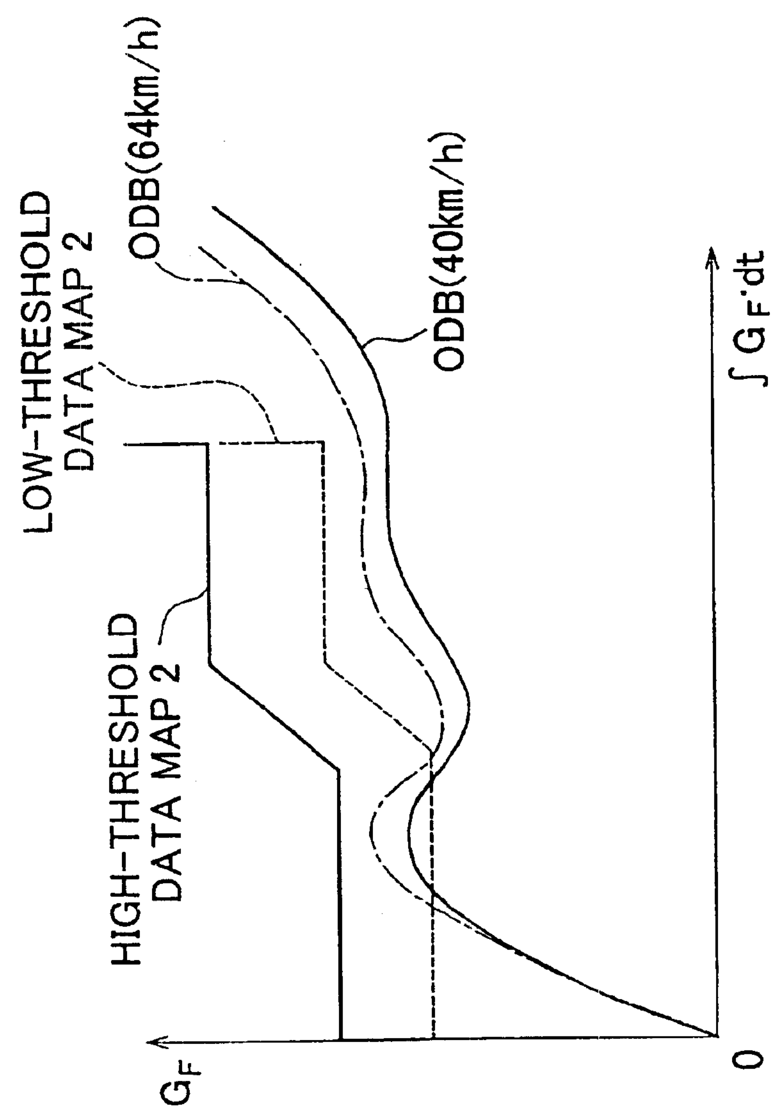
FIG. 10 a plot showing changes with the time of relationships between the deceleration value $G_F$ and the velocity $\int G_F \cdot dt$, in the respective two cases of ODB collision of FIG. 9.
Figure 11:
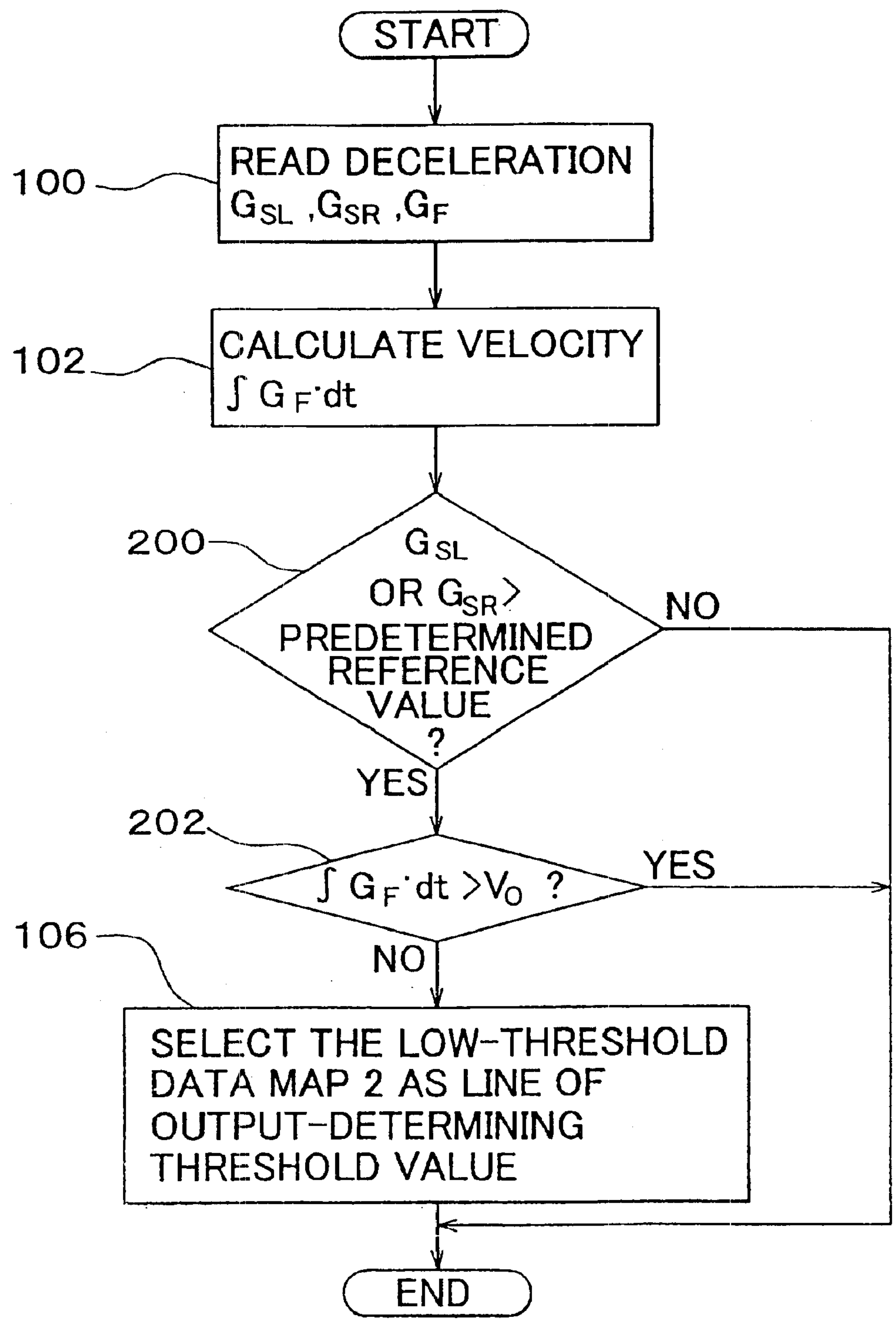
FIG. 11 is a flow chart illustrating an example of a control routine executed by a control apparatus according to a third embodiment of this invention, to select a line of an output-determining threshold value used for determining the output of the activated vehicle occupant protecting device.

Referring next to FIGS. 9–11 as well as FIGS. 1 and 6, there will be described a third embodiment of this invention. In the control apparatus according to this third embodiment, which is arranged to control the activation of the vehicle occupant 20 protecting device shown in FIG. 1, the ECU 12 is arranged to execute a control routine shown in FIG. 11.

It is noted that the output of the air bag device 30 is required to be set to the high value where the colliding speed in the ODB type offset collision is around 64 km/h, but is not required to the set to the high value where the colliding speed is around 40 km/h.

The graph of FIG. 9 shows changes with the time of the velocity $\int G_F \cdot dt$ in the ODB type offset collision at the colliding speed of 40 km/h as compared with that at the colliding speed of 64 km/h. FIG. 10 is a plot showing changes with the time of a relationship between the deceleration value $G_F$ and the velocity $\int G_F \cdot dt$ in the ODB type offset collision at the colliding speed of 40 km/h as compared with that at the colliding speed of 64 km/h. In FIGS. 9 and 10, the offset collision at the colliding speed of 40 km/h is indicated by a solid line, while the offset collision at the colliding speed of 64 km/h is indicated by a one-dot chain line.

As described above, the low-threshold data map 2 is formulated such that the output of the activated air bag device 30 is made low in the event of the slant collision at the colliding speed around 30 km/h, and high in the event of the offset collision of the ODB type at the colliding speed around 56 km/h. However, the point defined by the deceleration value $G_F$ obtained on the basis of the output signal of the floor sensor 14 and the velocity $\int G_F \cdot dt$ obtained as the time integral of the deceleration value $G_F$ in the event of the ODB type offset collision at the colliding speed of 40 km/h, as well as the point similarly defined in the event of the ODB type offset collision at the colliding speed of 64 km/h, is located between the lines of the low and high output-determining threshold values $SH_2$ represented by the high-threshold and low-threshold data maps 2. For setting the output of the air bag device 30 to the high value in the event of the offset collision at the colliding speed of 64 km/h and to the low value in the event of the offset collision at the colliding speed of 40 km/h, it is required to select the low-threshold data map 2 in the case of the colliding speed of 64 km/h, and the high-threshold data map 2 in the case of the colliding speed of 40 km/h, for the line of the threshold value $SH_2$ representing the relationship between the deceleration value $G_F$ and the velocity $\int G_F \cdot dt$.

The degree of impact to be applied to the vehicle body and the amount of deformation of the front portion of the vehicle body are smaller in the case of the colliding speed of 40 km/h than in the case of the colliding speed of 64 km/h. That is, the degree of impact applied to the front portion of the vehicle body has increased to a certain value at an earlier point of time when the colliding speed is comparatively high. Where the colliding speed is comparatively high, the deceleration value at the central portion of the vehicle body is not so high even when the degree of impact applied to the front portion of the vehicle body has increased to a relatively large value, as indicated by the one-dot chain line in FIG. 9. In other words, a large degree of impact has already been applied to the front portion of the vehicle body when the deceleration value at the central portion of the vehicle body has become considerably high. Where the colliding speed is comparatively low, the deceleration value at the central portion of the vehicle body is relatively high when the degree of impact applied to the front portion has become relatively large, as indicated by the solid line in FIG. 9. Namely, the degree of impact at the front portion of the vehicle body is not so large when the value of deceleration at the central portion due to the collision is relatively high.

Accordingly, by suitably determining a reference value to which the deceleration value $G_{SL}$, $G_{SR}$ obtained on the basis of the output signal of the satellite sensor 16, 18 has increased when the degree of impact at the front portion of the vehicle body has become relatively large, and a reference value to which the velocity $\int G_F \cdot dt$ obtained on the basis of the output signal of the floor sensor 14 has increased when the central portion of the vehicle body has been considerably decelerated, the ODB type offset collision at the colliding speed 40 km/h and that at the colliding speed 64 km/h can be distinguished from each other, depending upon a relationship between the moment when the deceleration value $G_{SL}$, $G_{SR}$ has reached the determined reference value and the moment when the velocity $\int G_F \cdot dt$ has reached the determined reference value. This arrangement makes it possible to set the output of the air bag device 30 to the high value in the event of the ODB type offset collision at the colliding speed of 64 km/h, and to the low value in the event of the ODB type offset collision at the colliding speed of 40 km/h.

The flow chart of FIG. 11 illustrates an example of a control routine executed by the ECU 12 in the present third embodiment to determine the line of the output-determining threshold value $SH_2$. The control routine illustrated in FIG. 11 is repeatedly executed with a predetermined cycle time. The same step numbers as used in the control routine of FIG. 7 are used in the control routine of FIG. 11, to identify the same steps, and description of these steps is omitted or simplified. In the control routine of FIG. 11, step 200 is implemented after the velocity $\int G_F \cdot dt$ has been calculated in step 102.

Step 200 is provided to determine whether one of the deceleration values $G_{SL}$, $G_{SR}$ obtained in step 100 is higher than the predetermined reference value. The reference value is a value of the deceleration $G_{SL}$, $G_{SR}$ above which it is possible to determine that a relatively large degree of impact is applied to the front portion of the vehicle body. This reference value is consistent with the above-described output-threshold determining threshold value $SH_4$ used to select one of the high-threshold and low-threshold data maps 2. If an affirmative decision (YES) is obtained in step 200, it indicates that the degree of impact at the front portion of the vehicle body has become relatively large. In this case, the control flow goes to step 202. If a negative decision (NO) is obtained in step 200, one cycle of execution of the present control routine is terminated.

Step 202 is provided to determine whether the velocity $\int G_F \cdot dt$ calculated in step 102 is higher than a predetermined reference value $V_0$. If an affirmative decision (YES) is obtained in step 202, it indicates that it is possible to determine that the central portion of the vehicle body has been considerably decelerated when the degree of impact at the front portion of the vehicle body has become relatively large. In this case, it is possible to determine that the colliding speed of the ODB type offset collision is comparatively low, so that the output of the air bag device 30 is required to be set to the low value. When the affirmative decision (YES) is Obtained in step 202, therefore, the normally selected high-threshold data map 2 is required to be maintained, without changing the line of the output-determining threshold value $SH_2$. In this case, one cycle of execution of the present control routine is terminated.

If a negative decision (NO) is obtained in step 202, it is possible to determine that the central portion of the vehicle body has not been considerably decelerated even when the degree of impact at the front portion has become relatively large. In this case, therefore, it is possible to determine that the vehicle 10 has undergone the ODB type offset collision at the comparatively high colliding speed, so that the output of the air bag device 30 is set to the high value. Accordingly, the control flow goes to the above-described step 106 to select the low-threshold data map 2 representing the line of the low output-determining threshold value $SH_2$.

According to the arrangement described above, the low-threshold data map 2 representing the line of the low output-determining threshold value $SH_2$ is selected when a large degree of impact is applied to the central portion of the vehicle body, or when the deceleration value at the central portion of the vehicle body is not so high upon application of a relatively large degree of impact to one of the front left and right portions of the vehicle body. This arrangement permits accurate distinction between the ODB type offset collision at the colliding speed of 56 km/h and the slant collision, and an adequate change of the output of the air bag device 30 between the high and low values, depending upon whether the collision is the offset collision or the slant collision, while at the same time permitting accurate distinction between the ODB type offset collisions at the colliding speeds of 64 km/h and 40 km/h, and an adequate change of the output of the air bag device 30, depending upon whether the colliding speed is 64 km/h or 40 km/h.

After the control routine of FIG. 11 is executed, the control routine of FIG. 6 is executed, using the output-determining threshold value $SH_2$ represented by the high-threshold or low-threshold data map 2 selected in the control routine of FIG. 11. Where the degree of impact is larger than the threshold value $SH_2$, the output of the air bag device 30 is set to the high value in the control routine of FIG. 6. Thus, the present control apparatus permits an adequate change of the output of the air bag device 30 depending upon the type of the collision of the vehicle, and the colliding speed of the offset collision of the ODB type. Accordingly, the present control apparatus makes it possible to control the activation of the air bag device 30 so as to effectively protect the vehicle operator or passenger, depending upon the type of the collision of the vehicle 10 and the colliding speed.

In the present third embodiment, the predetermined reference value for the deceleration value $G_{SL}$, $G_{SR}$ used for determining the output of the air bag device 30 is consistent with the output-threshold determining threshold value $SH_4$ used to select one of the two lines of the output-determining threshold value $SH_2$. This arrangement does not require the satellite sensors 16, 18 to be an electronic sensor capable of generating an output signal whose level changes with the deceleration value $G_{SL}$, $G_{SR}$ in the longitudinal direction of the vehicle. Namely, the present arrangement permits the satellite sensors 16, 18 to be a mechanical sensor which is arranged to generate an ON signal when the longitudinal deceleration value becomes higher than the predetermined reference value. This modified arrangement permits the air bag device 30 to be activated with a comparatively high possibility when the degree of impact applied to the front portion of the vehicle is relatively large, and assures an adequate change of the output of the air bag device 30 depending upon the type and speed of the collision of the vehicle 10.

In the third embodiment described above, the deceleration value $G_F$ represented on the line defined by the deceleration value $G_F$ obtained on the basis of the output signal of the floor sensor 14 and the velocity $\int G_F \cdot dt$ obtained as a time integral of the deceleration value $G_F$ corresponds to a first parameter, while the velocity $\int G_F \cdot dt$ obtained as a time integral of the deceleration value $G_F$ obtained on the basis of the output signal of the floor sensor 14 corresponds to a second parameter. Further, a portion of the ECU 12 assigned to implement the above-described step 106 in response to results of the determinations in the above-described steps 200 and 202 constitutes threshold changing means.

Referring next to FIG. 12 as well as FIG. 1, there will be described a fourth embodiment of this invention. In the control apparatus according to this fourth embodiment, which is arranged to control the activation of the vehicle occupant protecting device shown in FIG. 1, the ECU 12 is arranged to execute a control routine shown in FIG. 12.

The flow chart of FIG. 12 illustrates an example of a control routine executed by the ECU 12 to determine the output of the air bag device 30 upon its activation. This control routine is repeatedly executed with a predetermined cycle time. The same step numbers as used in the control routines of FIGS. 6 and 8 are used in the control routine of FIG. 12, to identify the same steps, and description of these steps is omitted or simplified. In the control routine of FIG. 12, step 220 is implemented after the velocity $\int G_F \cdot dt$ has been obtained in step 122 by integrating the deceleration value $G_F$ with respect to the time.

Step 220 is provided to determine whether the deceleration value $G_F$ obtained in step 120 is higher than the output-determining threshold value $SH_2$ represented by the high-threshold data map 2. If it is determined in step 220 that the inequality $G_F > SH_2$ is satisfied, it indicates that a relatively large degree of impact is applied to the central portion of the vehicle body. In this case, therefore, the output of the activated air bag device 30 is required to be set to the high value, irrespective of the degree of impact applied to the front portion of the vehicle body. When it is determined in step 220 that the inequality $G_F > SH_2$ is satisfied, therefore, the control flow goes to the above-described step 126 to set the output of the air bag device 30 to the high value. If it is determined in step 220 that the inequality $G_F > SH_2$ is not satisfied, the control flow goes to step 222.

Step 222 is provided to determine whether the deceleration value $G_F$ is higher than the threshold value $SH_2$ represented by the low-threshold data map 2. If the vehicle 10 has undergone the ODB type offset collision at the colliding speed around 56 km/h while it is determined in step 222 that the inequality $G_F > SH_2$ is satisfied, the output of the air bag device 30 is required to be set to the high value. If the vehicle 10 has undergone the ODB type offset collision at the colliding speed around 40 km/h, on the other hand, the output of the air bag device 30 is required to be set to the low value. Therefore, if it is determined in step 222 that the inequality $G_F > SH_2$ is satisfied, the control flow goes to step 224 If it is not determined in step 222 that the that the inequality $G_F > SH_2$ is satisfied, it is possible to determine that the degree of impact applied to the central portion of the vehicle body is not so large, and that the output of the air bag device 30 is not required to be set to the high value. In this case, the control flow goes to the above-described step 130 to set the output of the air bag device 30 to the low value.

Step 224 is-provided to determine whether the deceleration value $G_{SL}$ or $G_{SR}$ is higher than the predetermined reference value. When an affirmative decision (YES) is obtained in step 224, it is possible to determine that the degree of impact applied to the front portion of the vehicle body has become relatively large. In this case, therefore, the control flow goes to step 226. If a negative decision (NO) is obtained in step 224, the control flow goes to the above-indicated step 130.

Step 226 is provided to determine whether the velocity $\int G_F \cdot dt$ is higher than a predetermined reference value $V_0$. If an affirmative decision (YES) is obtained in step 226, it is possible to determine that the central portion of the vehicle body has been considerably decelerated when the degree of impact at the front portion of the vehicle body has become relatively large, and that the colliding speed is relatively low when the vehicle 10 has undergone the ODB type offset collision. In this case, the output of the air bag device 30 is required to be set to the low value. Therefore, the control flow goes to the above-described step 130 when the affirmative decision is obtained in step 226.

When a negative decision (NO) is obtained in step 226, it is possible to determine that the deceleration value at the central portion of the vehicle body is not so high even while the degree of impact at the front portion of the vehicle body is relatively large, and that the colliding speed is relatively high when the vehicle 10 has undergone the ODB type offset collision. In this case, the output of the air bag device 30 is required to be set to the high value, so that the control flow goes to the above-described step 126 when the negative decision is obtained in step 226.

The arrangement according to the fourth embodiment described above permits the output of the air bag device 30 to be set to the high value where a large degree of impact is applied to the central portion of the vehicle body, or where the deceleration value at the central portion of the vehicle body is not so high when a relatively large degree of impact is applied to one of the front left and right portions of the vehicle body. Thus, the output of the air bag device 30 is suitably adjusted depending upon the type of the collision of the vehicle 10. In addition, the present arrangement permits adequate control of the output of the air bag device 30 depending upon the colliding speed in the event of the offset collision of the ODB type. Thus, the control apparatus according to the present embodiment permits the air bag device 30 to be activated so as to effectively protect the vehicle operator or passenger, in the event of the ODB type offset collision, depending upon the colliding speed.

In the fourth embodiment described above, the output-determining threshold value $SH_2$ represented by the low-threshold data map 2 and used in step 222, the high output-determining threshold value $SH_2$ represented by the high-threshold data map 2 and used in step 220, the reference value used in step 224, and the reference value $V_0$ used in step 226, respectively correspond to a first threshold value, a second threshold value, a predetermined first reference value and a predetermined second reference value. A portion of the ECU 12 assigned to implement the above-described steps 126, 130 and 220–226 constitutes output control means.

The control routine of the third embodiment illustrated in FIG. 11 is formulated such that the data map representing the line of the output-determining threshold value $SH_2$ is changed to the low-threshold data map 2 if the velocity $\int G_F \cdot dt$ when one of the deceleration values $G_{SL}$, $G_{SR}$ has reached the predetermined reference value is higher than the predetermined reference value $V_0$. On the other hand, the control routine of the fourth embodiment illustrated in FIG. 12 is formulated such that the output of the air bag device 30 is set to the high value if the velocity $\int G_F \cdot dt$ when one of the deceleration values $G_{SL}$, $G_{SR}$ has reached the predetermined reference value is higher than the predetermined reference value $V_0$. However, the present invention is not limited to these control routines. For instance, tile determination as to whether the low-threshold data map 2 should be selected or the output of the air bag device 30 should be set to the high value may be effected depending upon whether one of the deceleration values $G_{SL}$, $G_{SR}$ when the velocity $\int G_F \cdot dt$ has reached the reference value $V_0$ is higher than the predetermined reference value or not. In this modified arrangement, the data map representing the line of the output-determining threshold value $SH_2$ is changed to the low-threshold data map 2, or the output of the air bag device 30 is set to the high value, if one of the deceleration values $G_{SL}$, $G_{SR}$ when the velocity $\int G_F \cdot dt$ has reached the reference value $V_0$ is higher than the predetermined reference value. If one of the deceleration values $G_{SL}$, $G_{SR}$ when the velocity $\int G_F \cdot dt$ has reached the reference value $V_0$ is not higher than the predetermined reference value, the high-threshold data map 2 or the low output value of the air bag device 30 is maintained.

The control apparatus constructed according to each of the first through fourth embodiments of the present invention is arranged to substantially concurrently energize or excite the two ignition devices 38A, 38B in the respective inflators 34A, 34B, when the air bag device 30 is required to be activated so as to provide a comparatively high output, and to sequentially excite the two ignition devices 38A, 38B one after the other at a predetermined short time interval, when the air bag device 30 is required to be activated so as to provide a comparatively low output. However, the method of changing the output of the air bag device 30 upon its activation is not limited to the specific method in the illustrated embodiments. For instance, the ignition devices 38A, 38B may be arranged to generate respective different amounts of heat when they are energized, or to have respective different lengths of time between the moment of energization and the moment of heat generation.

In the above-mentioned embodiments, the high-threshold data map 1, the low-threshold data map 1, the AND data map, the OR data map, the high-threshold data map 2 and the low-threshold data map 2 as shown FIGS. 2 to 5 and 9, 10 are conceptual maps. Actually, the ECU 12 determined whether the $f(G_F)$, $G_{SL}$, $G_{SR}$, $G_F$ or $\int G_F \cdot dt$ changed with time after collision are larger than the respective threshold. The respective threshold is acquired from a respective function in the ECU 12.

In another concept in the invention, for example, whether $G_F$ reaches the output-determining threshold value $SH_2$ may be determined by determining whether a point defined by $G_F$ and $\int G_F \cdot dt$ is in an area located upper than the lines of the output-determining threshold value $SH_2$ as shown FIG. 5. This concept may apply to the determinations with respect to the FIGS. 2 to 4, 9, 10.

An apparatus for controlling an output of an air bag device 30 such that the output is made relatively high when a deceleration value $G_F$ detected by a floor sensor 14 disposed in a central portion of a vehicle body is higher than a threshold which changes with a velocity $\int G_F \cdot dt$ which is obtained as a time integral of the deceleration value $G_F$. The threshold is changed from a normally selected high value to a low value when one of two deceleration values $G_{SL}$, $G_{SR}$ detected by respective two satellite sensors 16, 18 disposed in front left and right portions of the vehicle body has reached a threshold value which changes with the velocity $\int G_F \cdot dt$.

What is claimed is:

1. A control apparatus for controlling an output of a vehicle occupant protecting device upon activation of the protecting device, characterized by comprising:

a first sensor disposed in a first portion of a body of a vehicle and operable to generate an output signal corresponding to a degree of impact applied to the first portion of the body;

output control means for controlling the output of the vehicle occupant protecting device such that the output is higher when a value of a parameter based on the output signal of the first sensor reaches a predetermined threshold value, than when the value of the parameter does not reach the predetermined threshold value;

a second sensor disposed in a second portion of the body of the vehicle located in front of the first portion, and operable to generate an output signal corresponding to a degree of impact applied to the second portion; and output-threshold changing means for changing the predetermined threshold value depending upon whether a value of a parameter based on the output signal of the second sensor reaches a predetermined value.

2. A control apparatus according to claim 1, wherein the threshold changing means changes the predetermined threshold value such that the predetermined threshold value is smaller when the value of the parameter based on the output signal of the second sensor reaches the predetermined value than when the value of the parameter based on the output signal of the second sensor does not reach the predetermined value.

3. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

output control means for controlling the output of the vehicle occupant protecting device such that the output is made relatively low when a value of a parameter based on the output signal of the first sensor does not reach a first threshold value, and is made relatively high when the value of the parameter reaches a second threshold value larger than the first threshold value; and a second sensor disposed in a second portion of the body of the vehicle located in front of the first portion, and operable to generate an output signal corresponding to a degree of impact applied to the second portion, and wherein the output control means is operable to control the output of the vehicle occupant protecting device depending upon whether the value of the parameter based on the output signal of the second sensor reaches a predetermined value, when the value of the parameter based on the output signal of the first sensor reaches the first threshold value but does not reach the second threshold value.

4. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

output control means for controlling the output of the vehicle occupant protecting device such that the output is higher when a value of a first parameter based on the output signal of the first sensor reaches a predetermined threshold value, than when the value of the first parameter does not reach the predetermined threshold value;

a second sensor disposed in a second portion of the body of the vehicle located in front of the first portion, and operable to generate an output signal corresponding to a degree of impact applied to the second portion; and output-threshold changing means for changing the predetermined threshold value, depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

5. A control apparatus according to claim 4, wherein the threshold changing means is operable to change the predetermined threshold such that the predetermined threshold value is smaller when the value of the second parameter based on the output signal of the first sensor has not reached the predetermined second reference value when the degree of impact obtained on the basis of the output signal of the second sensor reaches the predetermined value, than when the value of the second parameter has reached the predetermined second reference value.

6. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

output control means for controlling the output of the vehicle occupant protecting device such that the output is made relatively low when a value of a first parameter based on the output signal of the first sensor does not reach a first threshold value, and is made relatively high when the value of the first parameter reaches a second threshold value larger than the first threshold value; and a second sensor disposed in a second portion of the body of the vehicle located in front of the first portion, and operable to generate an output signal corresponding to a degree of impact applied to the second portion, and wherein the output control means is operable, when the value of the first parameter based on the output signal of the first sensor reaches the first threshold value but does not reach the second threshold value, to control the output of the vehicle occupant protecting device depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

7. A method for controlling an activating output of a vehicle occupant protecting device, wherein the vehicle includes:

a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion, the method comprising the steps of:

(a) determining whether a value of a parameter based on the output signal of the first sensor reaches a predetermined threshold value;

(b) controlling the output of the vehicle occupant protecting device such that the output is higher when the value of a parameter based on the output signal of the first sensor reaches the predetermined threshold value, than when the value of the parameter does not reach the predetermined threshold value; and (c) changing the predetermined threshold value depending upon whether a value of a parameter based on the output signal of the second sensor reaches a predetermined value.

8. The method according to claim 7, wherein the step of changing the predetermined threshold value includes changing the predetermined threshold value such that the predetermined threshold value is smaller when the value of the parameter based on the output signal of the second sensor reaches the predetermined value than when the value of the parameter based on the output signal of the second sensor does not reach the predetermined value.

9. A method for controlling an activating output of a vehicle occupant protecting device, wherein the vehicle includes:

a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion, the method being comprising the steps of:

(a) determining whether a value of a parameter based on the output signal of the first sensor does not reach a first threshold value;

(b) controlling the output of the vehicle occupant protecting device such that the output is made relatively low when it is determined that the value of the parameter based on the output signal of the first sensor does not reach the first threshold value;

(c) determining whether the value of the parameter reaches a second threshold value larger than the first threshold value;

(d) controlling the output of the vehicle occupant protecting device such that the output is made relatively high when the value of the parameter reaches the second threshold value; and (e) controlling the output of the vehicle occupant protecting device depending upon whether the value of the parameter based on the output signal of the second sensor reaches a predetermined value, when it is determined that the value of the parameter based on the output signal of the first sensor reaches the first threshold value but does not reach the second threshold value.

10. A method for controlling an activating output of a vehicle occupant protecting device, wherein the vehicle includes:

a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion, the method comprising:

(a) determining whether a value of a first parameter based on the output signal of the first sensor reaches a predetermined threshold value;

(b) controlling the output of the vehicle occupant protecting device such that the output is higher when the value of the first parameter based on the output signal of the first sensor reaches a predetermined threshold value, than when the value of the first parameter does not reach the predetermined threshold value; and (c) changing the predetermined threshold value, depending upon a relationship between a moment at which the degree of impact obtained on the basis of the output signal of the second sensor has reached a predetermined first reference value, and a moment at which the value of the second parameter based on the output signal of the first sensor has reached a predetermined second reference value.

11. The method according to claim 10, wherein the step of changing the predetermined threshold value includes changing the predetermined threshold such that the predetermined threshold value is smaller when the value of the second parameter based on the output signal of the first sensor has not reached the predetermined second reference value when the degree of impact obtained on the basis of the output signal of the second sensor reaches the predetermined first reference value, than when the value of the second parameter has reached the predetermined second reference value.

12. A method for controlling an activating output of a vehicle occupant protecting device, wherein the vehicle includes:

a first sensor disposed in a first portion of a body of a vehicle and operable to generate an output signal corresponding to a degree of impact applied to the first portion of the body; and a second sensor disposed in a second portion of the body of the vehicle located in front of the first portion, and operable to generate an output signal corresponding to a degree of impact applied to the second portion, the method comprising the steps of:

(a) determining whether a value of a first parameter based on the output signal of the first sensor does not reach than a first threshold value;

(b) controlling the output of the vehicle occupant protecting device such that the output is made relatively low when the value of the first parameter based on the output signal of the first sensor does not reach the first threshold value;

(c) determining the value of the first parameter reaches a second threshold value larger than the first threshold value;

(d) controlling the output of the vehicle occupant protecting device such that the output is made relatively high when the value of the first parameter reaches the second threshold value; and (e) controlling the output of the vehicle occupant protecting device depending upon a relationship between a moment at which the degree of impact obtained on the basis of the output signal of the second sensor has reached a predetermined first reference value, and a moment at which the value of the second parameter based on the output signal of the first sensor has reached a predetermined second reference value, when the value of the first parameter based on the output signal of the first sensor reaches the first threshold value but does not reach the second threshold value.

13. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

an output control portion that controls the output of the vehicle occupant protecting device such that the output is higher when a value of a parameter based on the output signal of the first sensor reaches a predetermined threshold value, than when the value of the parameter does not reaches the predeterminer threshold value;

a second sensor disposed in a second portion of the body of the vehicle located in front of the first portion, and operable to generate an output signal corresponding to a degree of impact applied to the second portion; and an output-threshold changing portion that changes the predetermined threshold value depending upon whether a value of a parameter based on the output signal of the second sensor reaches a predetermined value.

14. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

an output control portion that controls the output of the vehicle occupant protecting device such that the output is made relatively low when a value of a parameter based on the output signal of the first sensor does not reach a first threshold value, and is made relatively high when the value of the parameter reaches a second threshold value larger than the first threshold value; and a second sensor disposed in a second portion of the body of the vehicle located in front of the first portion, and operable to generate an output signal corresponding to a degree of impact applied to the second portion, and wherein the output control portion controls the output of the vehicle occupant protecting device depending upon whether the value of the parameter based on the output signal of the second sensor reaches a predetermined value, when the value of the parameter based on the output signal of the first sensor reaches the first threshold value but does not reach the second threshold value.

15. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

an output control portion that controls the output of the vehicle occupant protecting device such that the output is higher when a value of a parameter based on the output signal of the first sensor reaches a predetermined threshold value, than when the value of the first parameter does not reach the predetermined threshold value;

a second sensor disposed in a second portion of the body of the vehicle located in front of the first portion, and operable to generate an output signal corresponding to a degree of impact applied to the second portion; and an output-threshold changing portion that changes the predetermined threshold value, depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

16. A control apparatus for controlling an output of a vehicle occupant protecting device upon activation of the protecting device, comprising:

a first sensor disposed in a first portion of a body of a vehicle and operable to generate an output signal corresponding to a degree of impact applied to the first portion of the body;

an output control portion that controls the output of the vehicle occupant protecting device such that the output is made relatively low when a value of a parameter based on the output signal of the first sensor does not reach a first threshold value, and is made relatively high when the value of the parameter reaches a second threshold value larger than the first threshold value; and a second sensor disposed in a second portion of the body of the vehicle located in front of the first portion, and operable to generate an output signal corresponding to a degree of impact applied to the second portion, and wherein when the value of the first parameter based on the output signal of the first sensor reaches the first threshold value but does not reach the second threshold value, the output control portion controls the output of the vehicle occupant protecting device depending upon a relationship between a moment at which the degree of impact obtained on the basis of the output signal of the second sensor has reached a predetermined first reference value, and a moment at which a value of a second parameter based on the output signal of the first sensor has reached a predetermined second reference value.

* * * * *